(12) United States Patent
Shayler

(10) Patent No.: US 12,736,174 B2
(45) Date of Patent: Sep. 15, 2026

(54) SYSTEMS AND APPARATUS FOR MOUNTING POLES ONTO RAILINGS

(71) Applicant: Andrew Shayler, White Rock (CA)

(72) Inventor: Andrew Shayler, White Rock (CA)

( * ) Notice: Subject to any disclaimer, the term of this patent is extended or adjusted under 35 U.S.C. 154(b) by 244 days.

(21) Appl. No.: 18/652,748

(22) Filed: May 1, 2024

(65) Prior Publication Data

US 2025/0341098 A1 Nov. 6, 2025

(51) Int. Cl.
*F16M 13/02* (2006.01)

(52) U.S. Cl.
CPC ................................ *F16M 13/022* (2013.01)

(58) Field of Classification Search
CPC ...... A01K 97/10; F16M 13/022; F16M 13/02; F16B 2/10
USPC ......... 248/689, 534, 535, 539, 228.1, 228.4, 248/230.4, 231.51, 65, 71, 72, 73, 74.1, 248/74.4
See application file for complete search history.

(56) References Cited

U.S. PATENT DOCUMENTS 3,894,707 A * 7/1975 Heard ...................... F16B 2/08 248/225.11
4,852,840 A * 8/1989 Marks .................. F21V 21/088 362/147
5,829,723 A * 11/1998 Brunner ............. A61M 5/1415 248/222.13
5,857,658 A * 1/1999 Niemiec ............... A47B 37/04 248/539
6,023,800 A * 2/2000 Stickley .............. A61G 7/0507 5/503.1
7,562,422 B2 * 7/2009 D'Addario ............ G10G 5/005 24/701
7,980,521 B2 * 7/2011 Harr ................... A61M 5/1415 248/220.21
8,678,330 B2 * 3/2014 Silcox .................. A62C 35/68 169/41
9,314,009 B2 * 4/2016 Shaw, Jr. .............. A01K 97/10
11,262,018 B2 * 3/2022 Gupta .................... A47B 45/00
11,476,558 B2 * 10/2022 Tsorng ................ H01Q 1/1228
12,085,225 B2 * 9/2024 Jones ....................... A61B 5/70
2015/0167708 A1 * 6/2015 Latimer .................... B66F 1/00 248/231.51
2016/0040702 A1 * 2/2016 Broussard .............. F16B 2/065 248/228.2
2016/0161341 A1 * 6/2016 Yumoto ................... F16B 2/10 248/230.4
2021/0041058 A1 * 2/2021 Shayler ............... E04H 12/2269
2023/0216172 A1 * 7/2023 Nakachi .............. H01Q 1/1235 248/534

* cited by examiner

*Primary Examiner* — Terrell L Mckinnon
*Assistant Examiner* — Michael McDuffie

(57) ABSTRACT

Apparatus for coupling a pole to a railing are disclosed. One such apparatus includes a holder for holding a pole. The holder is attached to a J shaped bracket. The J shaped bracket is attached to one side of a railing. A back piece is attached to the other side of the railing and coupled to a top plate of the J shaped bracket using bolts from the back piece that slide into tapered L shaped slots on the top plate. Sliding the back piece while the bolts are in the tapered L shaped slots so as to slide the bolts along the tapered L slots into a locked final position tightens the apparatus around the railing. The bolts can be tightened against the top surface of the top plate to affix the apparatus to the railing.

13 Claims, 9 Drawing Sheets

SYSTEMS AND APPARATUS FOR MOUNTING POLES ONTO RAILINGS

TECHNICAL FIELD

The present disclosure relates to mounts, and in particular, mounts for attaching poles to railings.

BACKGROUND

Decks, gardens and backyards have been used for family gatherings and social events for as long as they have been around. A multi-billion dollar industry has grown around decks and yards to produce items for use in decks and yards, including furniture, cookers, and decorative items. Some of the most common items used on decks and in yards include tables and chairs with deck umbrellas, torches, and decorative items such as flags.

Various types of holders for holding umbrellas, torches, flags and other items are available on the market, including both permanently fixed and easily removable types of holders. Additionally, some are stand alone while others are attached to other items or fixtures. Various types of equipment and methods are used to secure the holders in place. For example, stand alone holders are often weighted. Other types of holders may be attached to furniture, walls, or railings, such as deck railings. Some of these may be screwed or bolted in place. Some holders that are available are attachable to the posts and/or balusters of a deck railing. These types of holders may be secured in position using a clamping mechanism. Various types of clamping mechanisms are available, including clamping mechanisms that use bolts, screws and springs.

There exists a continuing desire to advance and improve technology related to railing mounts.

SUMMARY

According to one aspect, there is provided a modular apparatus for coupling a pole to a railing. The apparatus may include a holder for holding a pole. The apparatus may also include a J shaped bracket piece for attaching onto a first side of a top rail of the railing. The J shaped bracket piece may be coupled to the holder for holding the holder over a side of the railing. The J shaped bracket piece may include a top plate for bearing against a top side of the top rail. The top plate may include at least one tapered L-slot having a first leg running adjacent to a back edge of the top plate. The at least one tapered L-slot may have a second leg opening out at the back edge of the top plate with the first leg being less than one third of a total length of the back edge of the top plate and being tapered such that a first end of the first leg is closer to the back edge of the top plate than a second end of the first leg, with the first end of the first leg being adjacent to the second leg of the at least one tapered L-slot.

The apparatus may also include a back piece comprising a back plate for bearing against a back side of the railing and a back-bottom plate for bearing against a back bottom of the railing. The back-bottom plate may be adjustably coupled to the back plate and the back plate may have at least one stud extension extending from a top edge for engagement with the at least one tapered L-slot.

There may also be a back plate tightening head coupleable with the at least one stud extension for tightening to bear against the top plate to hold the back piece in a first position, where the first position is a position where the stud extension is positioned at the first end of the first leg, and for further tightening to bear against the top plate at a locked final position after the back piece is slid relative to the top plate for moving the stud extension into the locked final position. The locked final position may be where the stud extension is positioned at the second end of the first leg. Sliding the back piece relative to the front piece such that the stud extension is moved from the first position to the locked final position may lock the apparatus onto the railing.

The J shaped bracket piece of the apparatus may also include a front plate for bearing against a front side of the railing. The front plate may be adjustably coupled to the top plate for positioning the front plate relative to the top plate. The front plate may be located distal to the back edge of the top plate.

The J shaped bracket piece of the apparatus may also include a front-bottom plate for bearing against a front bottom side of the railing. The front-bottom plate may be adjustably coupled to the front plate for positioning the front-bottom plate relative to the front plate, wherein the J shaped bracket piece may be attached to the first side of the railing by placing the top plate onto the top of the railing and adjusting the front plate to bear against the front side of the railing and the front-bottom plate to bear against the front bottom side of the railing.

The top plate may include at least one top plate slot extending laterally from a central portion of the top plate towards a front edge of the top plate. The front plate may include at least one front plate stud for extending from a top edge of the front plate for engagement with the at least one top plate slot such that the front plate may be slidably engaged with the top plate as well as at least one front-plate tightening head that corresponds with the at least one front plate stud for tightening against the top plate for locking the front plate into position relative to the top plate.

The front plate may include at least one front plate slot extending along a second length of the front plate and oriented in a vertical direction. The vertical direction may be along a line extending from the top plate towards the front-bottom plate.

The front-bottom plate may include at least one front-bottom plate stud and tightening head combination for engagement with the at least one front plate slot for sliding engagement of the front-bottom plate with the front plate and for locking the front-bottom plate into position relative to the front plate.

The back plate may include at least one back plate slot extending along a fourth length of the back plate and oriented in a second vertical direction. The second vertical direction may be oriented along a line extending from the top plate to the back-bottom plate.

The back-bottom plate may include at least one back-bottom plate stud and tightening head combination for engagement with the at least one back plate slot for sliding engagement of the back-bottom plate with the back plate and locking the back-bottom plate into position relative to the back plate.

The holder may be sized and shaped to hold a pole, wherein the pole may be passed through a hole in the holder and held in place by a set screw that screws through a wall of the holder and against the pole.

The holder may be front loading. The holder may include a back holder piece coupled to the J shaped bracket piece. The holder may also include a front holder piece coupled to the back holder piece with a hinged coupling for opening and closing the holder. The holder may further include a catch for securing the front holder piece to the back holder piece when the holder is in a closed position, with the catch positioned across the holder from the hinged coupling. The holder may also include a set screw for screwing through a threaded hole in a wall of the front holder piece for tightening against a pole when the holder is in the closed position.

The catch may include a lip in the back holder piece and a corresponding hook in the front holder piece for engagement with the lip when the holder is in a closed position.

The front holder piece may also include a transverse slot at the hinged coupling for sliding the front holder piece transversely relative to the back holder piece for sliding the hook of the front holder piece over the lip of the back holder piece and closing the holder.

Each of the top plate, the back plate, the front plate, the back-bottom plate and the front-bottom plate may include at least one replaceable pad attached to a bearing surface of each of the top plate, the back plate, the front plate, the back-bottom plate and the front-bottom plate for engagement with the railing. The at least one replaceable pad may be comprised of a material that is softer than the material of its corresponding top plate, back plate, front plate, back-bottom plate or front-bottom plate for gripping the railing.

The apparatus of claim 5 wherein the at least one replaceable pad attached to the bearing surface of the back plate and the back-bottom plate has a lower friction coefficient than the back plate or the back-bottom plate for increasing the slidability of the back plate and back-front plate against the railing relative to the slidability of the back plate and back-front plate without the at least one replaceable pad.

The back-bottom and back-front plates may be spaced apart when the apparatus is attached to the railing.

The apparatus may further include a bottom bracket for coupling to the railing from a position underneath the railing. The bottom bracket may include a rod for passing underneath the railing in a direction perpendicular to a first direction, with the first direction being a direction oriented along a length of the railing. The bottom bracket may also include a front wall piece coupled to the rod for bearing against a front side of a bottom portion of the railing. The bottom bracket may further include a back wall piece for sliding onto and along the rod relative to the front wall piece for bearing against a back side of the bottom portion of the railing, the back wall piece being reversibly lockable against the back side of the bottom portion of the railing. The bottom bracket may also include a bottom collar for holding a bottom portion of the pole. The bottom collar may be coupled to the rod at a first rod end of the rod, the first rod end being distal to the back wall piece and proximal to the front wall piece. Locking the back wall piece against the back side of the bottom portion of the railing and holding a bottom portion of the pole in the bottom collar may be for reducing torque from the apparatus on the railing.

BRIEF DESCRIPTION OF THE DRAWINGS

In the accompanying drawings, which illustrate one or more example embodiments.

DETAILED DESCRIPTION

Figure 1:
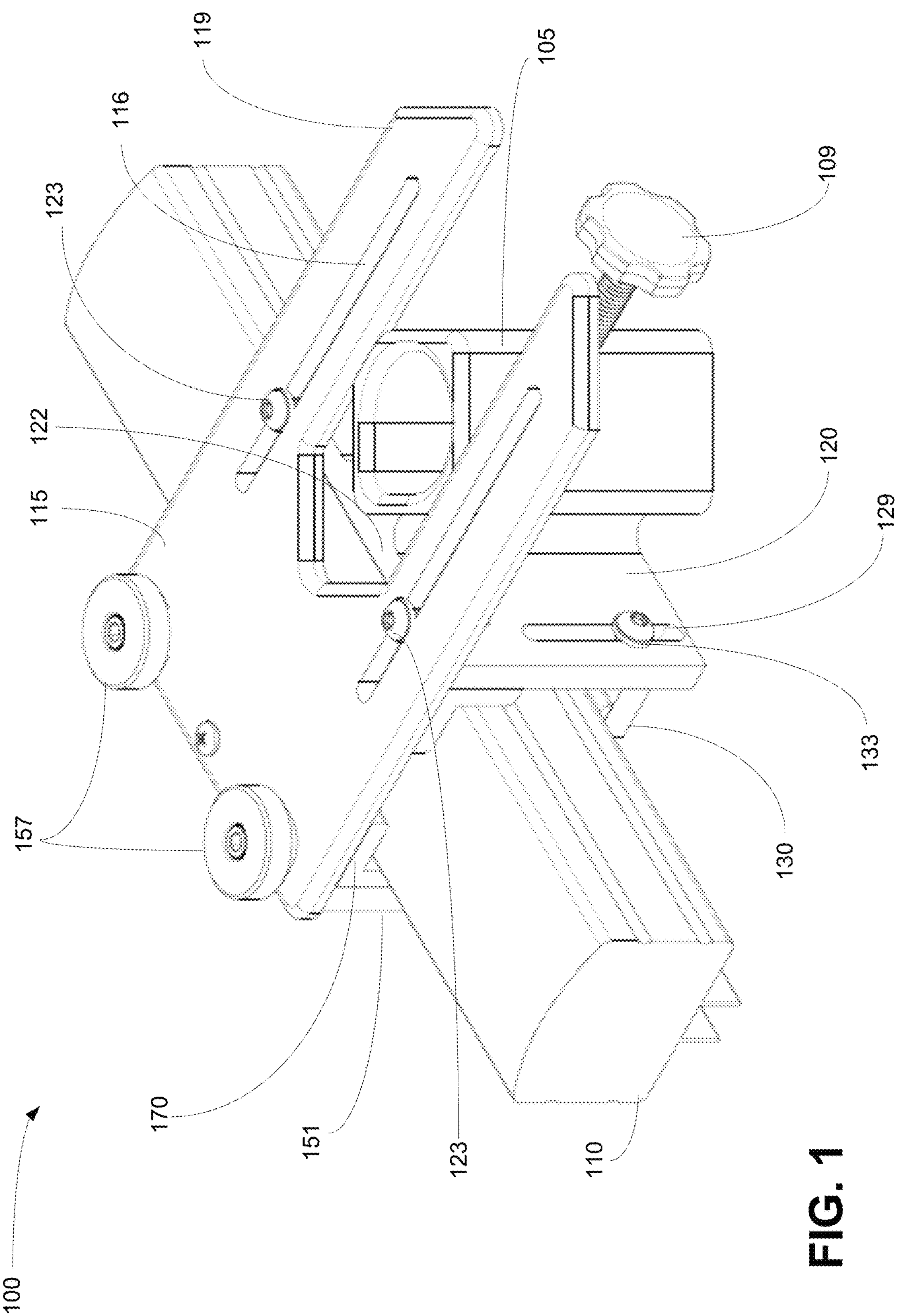
FIG. 1 is a perspective view of an apparatus, according to one embodiment.

Directional terms such as "top", "bottom", "upper", "lower", "left", "right", and "vertical" are used in the following description for the purpose of providing relative reference only, and are not intended to suggest any limitations on how any article is to be positioned during use, or to be mounted in an assembly or relative to an environment. Additionally, the term "couple" and variants of it such as "coupled", "couples", "coupling", and "couplable" as used in this description are intended to include indirect and direct connections unless otherwise indicated. For example, if a first device is coupled to a second device, that coupling may be through a direct connection or through an indirect connection via other devices and connections. Similarly, if the first device is communicatively coupled to the second device, communication may be through a direct connection or through an indirect connection via other devices and connections. The term "couplable", as used in the present disclosure, means that a first device is capable of being coupled to the second device. A first device that is communicatively couplable to a second device has the ability to communicatively couple with the second device but may not always be communicatively coupled.

Various types of holders are available for holding umbrellas, tiki torches, flags and other items that are mounted to poles. These holders are generally designed to be stable and hold the item securely. Many types of designs are used to achieve this. For example, many of these holders are weighted to prevent them from falling down, making them heavy and cumbersome. Certain holders are designed to be attached to an external surface or item. For example, some umbrellas are designed to be attached to a table, although additional weights may still be used to secure the umbrella. Screws and bolts may be used to secure holders to walls or posts.

Several types of holders have been designed to be attached to a railing, such as a deck railing. These types of holders may be attached to the spindles of the railing or posts of a railing. Using a railing as a base may be advantageous as a railing is often located in places where one may use an umbrella or tiki torch. Furthermore, railings may provide a strong base for securing a holder.

Often, these holders may be difficult to assemble and attach to a railing. They may also not securely attach to a railing. Some holders for umbrellas may be bulky, thereby decreasing the portability of the holder. Some holders may also include parts that increase manufacturing costs.

The present disclosure provides a modular apparatus for holding items, such as umbrellas and flag poles, that clamps onto a mount, such as the top rail of a railing. The apparatus may be portable and may be installed quickly. It may be fitted around a railing or other similar mount and clamped into position.

With few parts, the apparatus provides for a holder that may be relatively inexpensive when compared to other types of holders and may be quickly attached or removed to a railing. A modular design may allow for accessories or replacement of pieces for allowing attachment to a wider range of mounts, such as bleachers. The apparatus may have a rigid design, without hinged parts, allowing the apparatus attach to a wider range of shapes of railings, such as round railings in addition to standard railings with rectangular cross sections. The use of replaceable insert pads for gripping the railing may further increase the ability of the apparatus to securely attach to a wide variety of railing types. Additionally, various types of items may be held. For example, the same apparatus may be used to hold an umbrella, a tiki torch or a flag.

Figure 2:
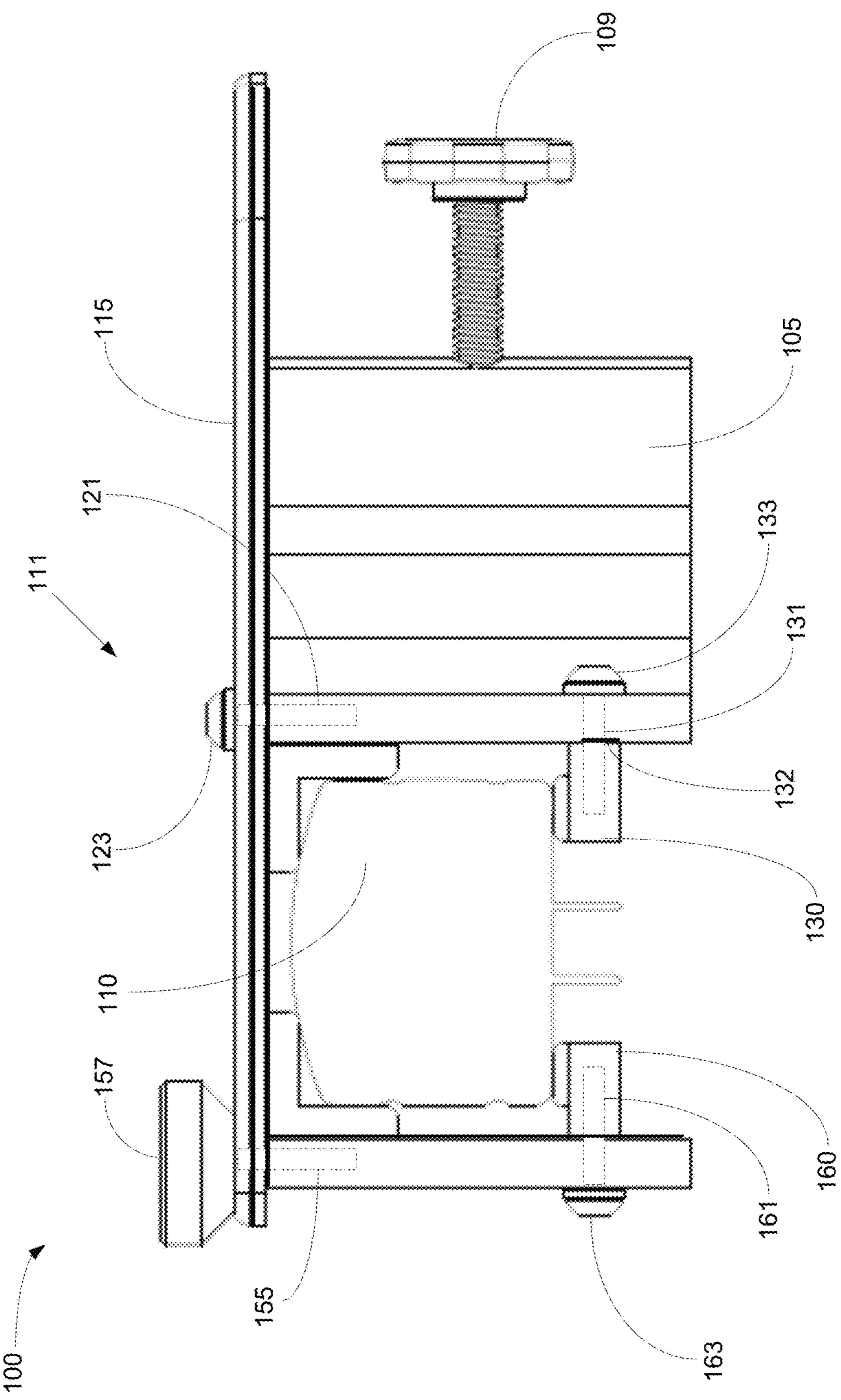
FIG. 2 shows a side view of an apparatus, according to one embodiment.

Referring to FIG. 1 and FIG. 2, a modular apparatus 100 for coupling a pole to a railing 110 is provided. In some embodiments, the railing may be a top rail of a railing. The rail may have, for example, a rectangular, square, or round cross section. Railings with curved sides may also be used as mounts. In certain embodiments, mounts may have custom or odd cross-sections.

The modular apparatus 100 may include a holder 105 for holding items such as, without limitation, umbrella posts, flag posts, tiki torches, road signs, plant pots, and cups. The size and shape of the holder 105 may be based on the item to be held. For example, in some embodiments, the holder 105 may have any suitable size and shape for holding a pole. In certain embodiments, the holder 105 may have a cross section of a circular pipe, meaning a circular cross section with a hole through the center. In other embodiments, the holder 105 may have a cross-section with straight sides, such as a square or other polygonal shape. As shown in FIG. 1 and FIG. 2, the holder 105 may have an open bottom and a portion of the pole may pass through the holder 105. For example, the holder 105 may be a ring. In certain embodiments, the holder 105 may have a closed bottom and in other embodiments, a partially open bottom.

The holder 105 may have any suitable type of side walls. For example, in some embodiments, the walls of the holder 105 may be solid, forming a tube. In certain embodiments, there may be spaces in the walls of the holder 105. For example, the side walls may be formed of a mesh or bands in some embodiments. In certain embodiments, the holder 105 may include a rod, plate or bar with bands attached to it. In some embodiments, the bands may be band clamps for securing the item to be held.

In some embodiments, the holder 105 may be able to accommodate items of different sizes and shapes. For example, the holder 105 may be able to hold a pole having a circular or a square cross-section and poles of different thicknesses. Any suitable way of tightening or securing the item in the holder 105 may be used. For example, in some embodiments, a set screw or a tightening bolt with a knob 109, as shown in FIG. 1 and FIG. 2, may be used for securing the item in the holder 105. The pole may be held in place in the holder 105 by a set screw that screws through a wall of the holder 105. For example, there may be a threaded hole in the wall of the holder 105 that the set screw screws through. In certain embodiments, the holder 105 may include other clamping systems to secure the item, such as band clamps. In some cases, bolts or screws may be used for tightening a wall of the holder 105 against the item to be held. In some embodiments, the holder 105 may be tapered down to a narrower cross-section along its length, allowing poles with a tapered thickness to be held securely.

The holder 105 may be formed of any suitable material, including, without limitation, metals such as aluminum and steel, plastic, and composites, including carbon fiber based materials and fibreglass.

Referring again to FIG. 1 and FIG. 2, in some embodiments, the apparatus may include a J shaped bracket piece 111 for clamping onto a first side of the railing 110. The J shaped bracket piece 111 may include a top plate 115 for bearing against a top side of the railing 110. The J shaped bracket piece 111 may be clamped onto the first side of the railing 110 by pushing a side of the J shaped bracket piece 111 against the first side of the railing 110 and moving a bottom portion of the J shaped bracket piece 111 relative to the top plate 115 and locking it into a position so as to squeeze the railing between the top plate 115 and the bottom portion of the J shaped bracket piece 111.

In some embodiments, the J shaped bracket piece 111 may also include a front plate 120 for bearing against the front side of the railing 110. The front plate 120 may be adjustably coupled to the top plate 115 for positioning the front plate 120 relative to the top plate 115.

Referring again to FIG. 1, in some embodiments, the J shaped bracket piece 111 may be coupled to the holder 105 for holding the holder 105 over a side of the railing 110. In some embodiments, the holder 105 may be directly coupled to the front plate 120 and in certain embodiments, the holder 105 may be coupled to the front plate 120 through other components.

In certain embodiments, an extension (not shown) may be used to couple the holder 105 to the front plate 120 in order to increase the clearance between a potential mount and the holder 105.

In some embodiments, not shown, the holder 105 may be coupled directly to the top plate 115. The top plate 115 may extend away from the railing 110 and past the front plate 120, with the holder 105 coupled to the top plate 115 so as to hold a pole beyond the front plate 120, with the front plate 120 positioned between the holder 105 and the railing 110.

The holder 105 may be coupled to the front plate 120, or, in certain embodiments, to the top plate 115, using any suitable connection. For example, and without limitation, the holder 105 may be coupled to the front plate 120 using welds, screws, bolts, adhesives, or clamps. In some embodiments, the holder 105 and the front plate 120 may be formed from a single piece of material.

Figure 6:
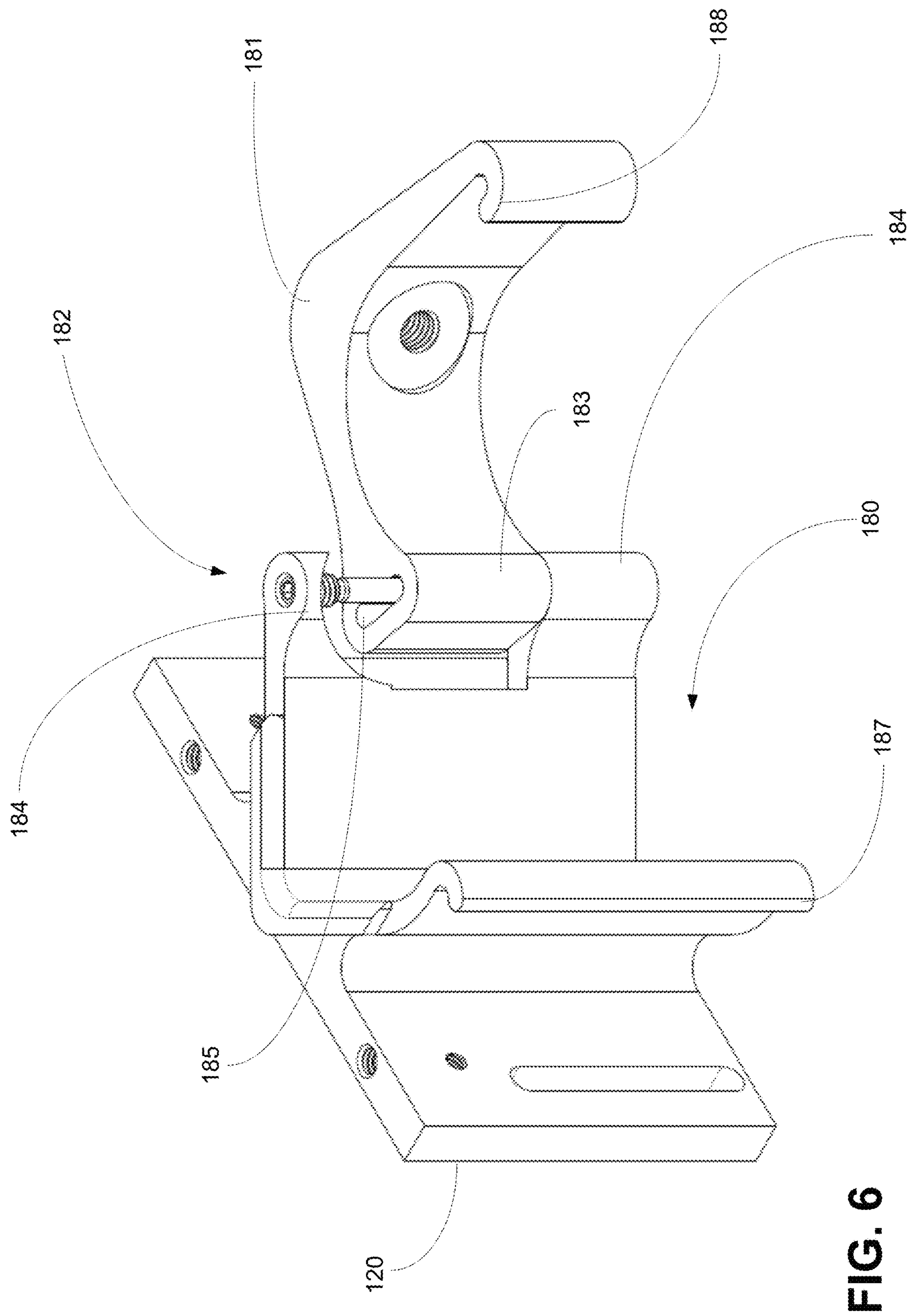
FIG. 6 is a perspective view of a front loading holder.
Figure 7:
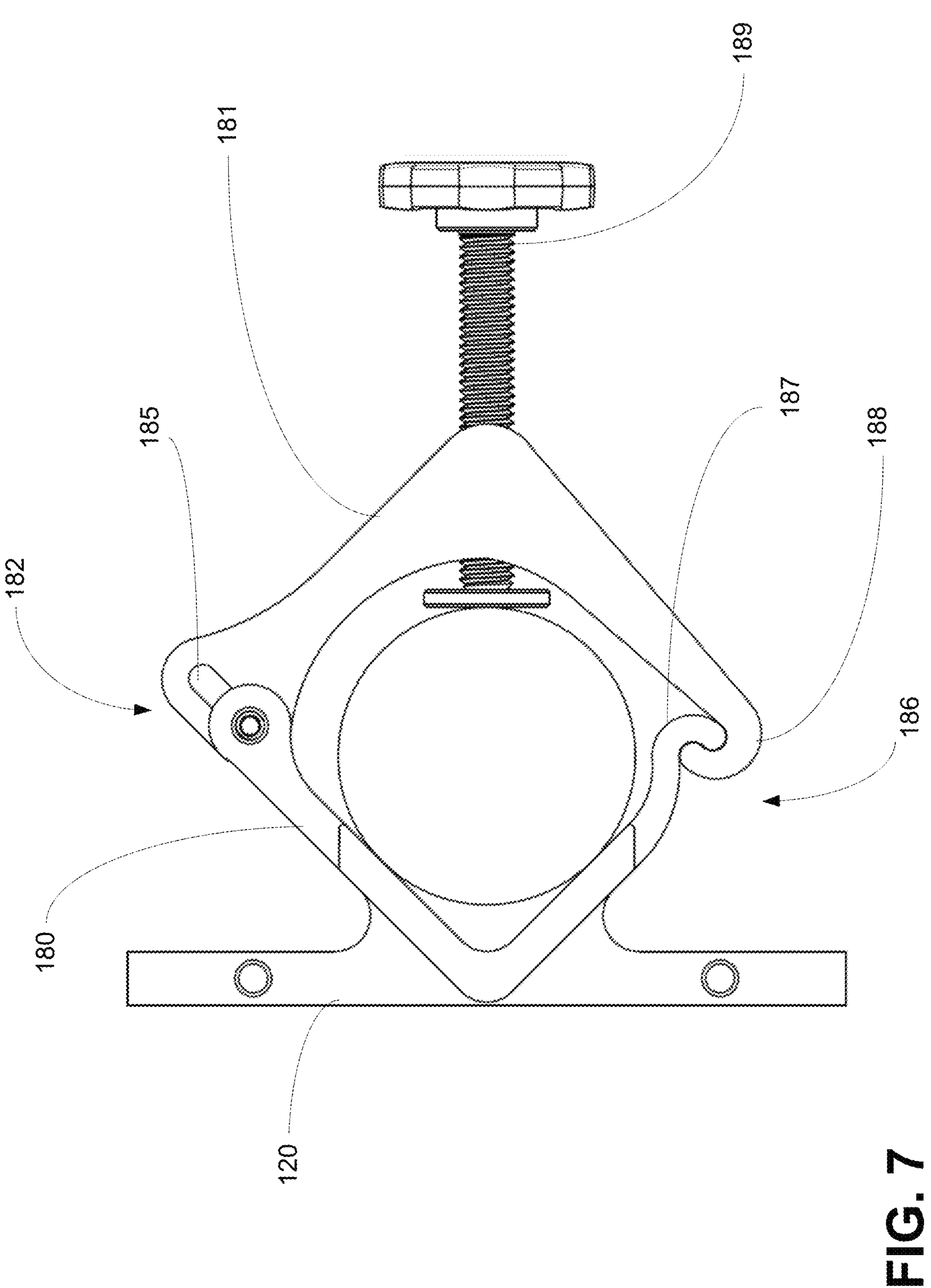
FIG. 7 is side view of a front loading holder.

Referring to FIG. 6 and FIG. 7, in some embodiments, the holder 105 may be front loading. Front loading, in this description, refers to opening a front portion of the holder 105, placing the pole inside and closing the front portion as opposed to passing the pole through a hole in the top of the holder 105. For example, the holder 105 may include a front wall or front holder piece 181 that swings open to allow a pole to be placed in the holder 105.

In some embodiments, the holder 105 may include a back holder piece 180 coupled to the J shaped bracket piece 111 shown in FIG. 1. The back holder piece 180 may be coupled to the J shaped bracket piece 111 using any suitable means. For example, and without limitation, the back holder piece 180 may be coupled to the J shaped bracket piece 111 using welds, screws, bolts, adhesives, or clamps. In some embodiments, the back holder piece 180 and the J shaped bracket piece 111 may be formed from a single piece of material.

In some embodiments, the holder 105 may also include a front holder piece 181 coupled to the back holder piece 180 with a hinged coupling 182 for opening and closing the holder 105. The front holder piece 181 may be swung open at the hinged coupling 182 for placement of the pole in the holder 105.

Any suitable type of hinge may be used as the hinged coupling 182. For example, in some embodiments, the front holder piece 181 may comprise a single knuckle 183 for positioning between two knuckles 184 of the back holder piece 180, with a pin passing through the knuckles 183, 184. In certain embodiments, the front holder piece 181 may comprise two knuckles and the back holder piece 180 may comprise a single knuckle whereas in other embodiments, each of the front holder piece 181 and the back holder piece 182 may comprise a single knuckle each. In still other embodiments, the front holder piece 181 may comprise multiple knuckles for positioning in gaps between multiple knuckles of the back holder piece 180. Any suitable number of knuckles may be used for each of the front holder piece 181 and the back holder piece 180.

In some embodiments, the hole for holding the pin in the single knuckle 183 of the front holder piece 181 may be elongated into a slot 185 for allowing transverse motion of the front holder piece 181 relative to the back holder piece 180. In certain embodiments, the front holder piece 181 further comprises a transverse slot 185 at the hinged coupling 182 for sliding the front holder piece 181 transversely relative to the back holder piece 180. The slot 185 may be used for closing a catch for securing the front holder piece 181 to the back holder piece 180 in some embodiments.

In some embodiments, the holder 105 may also include a catch 186 for securing the front holder piece 181 to the back holder piece 180 when the holder 105 is in a closed position. The catch 186 may be positioned across the holder 105 from the hinged coupling 182.

Any suitable catch 186 may be used for securing the front holder piece 181 to the back holder piece 180. For example and without limitation, in some embodiments, the catch 186 may be a clasp that may include a lip 187 in the back holder piece 180 and a corresponding hook 188 in the front holder piece 181 for engagement with the lip 187 when the holder 105 is in a closed position. As shown in FIG. 6, the lip 187 may run along an edge of the back holder piece 180 in a direction that would be parallel to a longitudinal axis of a pole placed in the holder 105. In some embodiments, the lip 187 may be oriented such that a tip of the lip 187 is pointed in a direction generally parallel to a front face of the front plate 120. In certain embodiments, the lip 187 may be oriented such that the tip of the lip 187 is oriented between about 0 degrees and 30 degrees towards the front plate 120 from the direction that is parallel to the front face of the front plate 120.

In some embodiments, the hook 188 may be positioned, shaped and sized to catch on the lip 187, with the lip 187 fitting into the throat of the hook 188. A portion of the edge of the front holder piece 181 that is distal from the hinged coupling 182 may be formed into the hook 188. In some embodiments, the entire edge of the front holder piece 181 may form the hook 188. In certain embodiments, less than the entire edge of the first holder piece 181 may form the hook 188.

In some embodiments, the transverse slot 185 may be used for sliding for sliding the hook 188 of the front holder piece 181 over the lip 187 of the back holder piece 180 and closing the holder 105. Prior to closing the holder 105, the front holder piece 181 may be slid relative to the back holder piece 180 such that the hook 188 would slide away from the lip 187 if the holder 105 were in a closed position. Swinging the front holder piece 181 towards the closed position of the holder 105 may allow the hook 188 to sit adjacent to the lip 187 without abutting the lip 187. From this position, the front holder piece 181 may be slid into the closed position of the holder 105 by sliding the hook 188 over the lip 187.

Each of the lip 187 and hook 188 may be shaped and sized to secure the front holder piece 181 to the back holder piece 182. The exact size may be determined by one skilled in the art based on the size of the holder 105. For example and without limitation, in some embodiments, the lip 187 and the hook 188 may each have an inner radius of about 3⁄16".

In some embodiments, the holder 105 may also include a set screw 189 for screwing through a threaded hole in a wall of the front holder piece 181 for tightening against a pole when the holder 105 is in the closed position. Securing the hook 188 over the lip 187 and tightening the set screw 189 may lock the front loading holder in place, thereby securing the pole in the holder 105.

The set screw 189 may be of any suitable size and may be formed of any suitable material. Additionally, the set screw 189 may have any suitable type of head. For example and without limitation, in some embodiments, the set screw 189 may have an enlarged head, such as a knob or flattened disk, for hand tightening. In certain embodiments, the set screw 189 may be tightenable through the use of a driver, such as a screw driver, or a wrench.

The end of the set screw 189 that is for contacting the pole may be of any suitable shape for bearing against the pole. For example and without limitation, in some embodiments, the end of the set screw 189 that contacts the pole may be enlarged to increase the area of the pole over which the force applied by the set screw 189 is distributed. In certain embodiments, the end of the set screw 189 that is for bearing against the pole may have attached to it a plastic or rubber piece. Adding a plastic or rubber piece to the end of the set screw 189 may be advantageous by increasing the protection of the pole from scratches or similar damage that the set screw may cause. Additionally, a plastic or rubber material may be chosen, in some embodiments, that has a higher friction than the material forming the body of the set screw 189, thereby increasing the grip of the holder 105 on the pole.

The front holder piece 181 and the back holder piece 180 may be suitably shaped and sized to hold a pole when the holder 105 is in a closed position. The pole itself may be of different sizes and shapes and various embodiments of the holder 105 may be sized for different types of poles. The use of the set screw 189 may provide flexibility for securing a pole that is smaller than a width of the space within the holder 105 when the holder 105 is closed. For larger poles, a larger holder 105 may be used. For example and without limitation, in some embodiments, holders 105 may be used for holding 2" poles. In certain embodiments, the holder may be used for holding 1½" poles.

In some embodiments, the front holder piece 181 and the back holder piece 180 may be shaped so that the holder 105 has a circular cross section when closed, with each of the front holder piece 181 and the back holder piece 180 having a semi-circular shape. In certain embodiments, the front and back holder pieces 181, 180 may be shaped so that the holder 105 has a square cross section when closed, with each of the front and back holder pieces 181, 180 being shaped like a corner angle bracket. In some embodiments, the back holder piece 180 may be positioned with the corner of the of the corner angle bracket coupled to the J shaped bracket piece and each wall extending out at an angle.

Referring again to FIG. 1 and to FIG. 2, the adjustable coupling between the top plate 115 and the front plate 120 may comprise, in some embodiments, a coupling of slots and bolts for sliding engagement of the front plate 120 relative to the top plate 115, as shown in FIG. 1. For example, in some embodiments, the top plate 115 may include at least one top plate slot 116 extending laterally from a central portion of the top plate 115 towards a front edge of the top plate 115. In some embodiments, the front plate 120 may comprise a rod or stud corresponding to the top plate slot 116 for engagement with the top plate slot 116. For example, referring again to FIG. 1 and FIG. 2, the front plate 120 includes at least one front plate stud 121 for extending from a first face 122 of the front plate 120, wherein the first face 122 of the front plate 120 is the side facing the top plate 115 when the J shaped bracket piece 111 is positioned around a side of the railing 110. The front plate stud 121 may pass through the top plate slot 116, allowing engagement with the at least one top plate slot 116 such that the front plate 120 is slidably engaged with the top plate 115. The front plate stud 121 may comprise a front plate tightening head 123 at one end for bearing against the top plate 115 for tightening the front plate 120 into position relative to the top plate 115.

In some embodiments, the first face 122 of the front plate 120 may have at least one threaded hole and the at least one front plate stud 121 may be threaded for screwing into the at least one threaded hole. In certain embodiments, the front plate stud 121 may be a bolt or screw for screwing into the at least one threaded hole in the first face 122 of the front plate 120. The bolt head may be shaped for tightening with a wrench or, in some embodiments, may be tightenable with a suitable driver, such as an Alan key or screw driver. Any standard or suitable bolt head or screw head may be used. The threaded hole and the corresponding front plate stud 121 may be of any suitable size. For example and without limitation, ¼"-20 NC bolts may be used.

In certain embodiments, the front plate stud 121 may be a stud attached to the first face 122 of the front plate 120. Any suitable attachment may be used, such as, for example, welding. In some embodiments, the stud may be formed with the front plate 120 as a single piece. The stud may be of any suitable size. The end of the stud may, in some embodiments, be threaded for receiving a nut.

As in the previous example, in some embodiments, the front plate tightening head 123 may be a nut for screwing onto a threaded portion of the front plate stud 121. In some embodiments, where the front plate stud 121 is not threaded at the end that will engage with the top plate slot 116, a non threaded fastener may be slid over the front plate stud 121 and used to hold the front plate 120 tight against the top plate 115. Any suitable non threaded fastener may be used in these embodiments, including, for example and without limitation, self locking stud receivers, speed nuts and spring rings.

Figure 4:
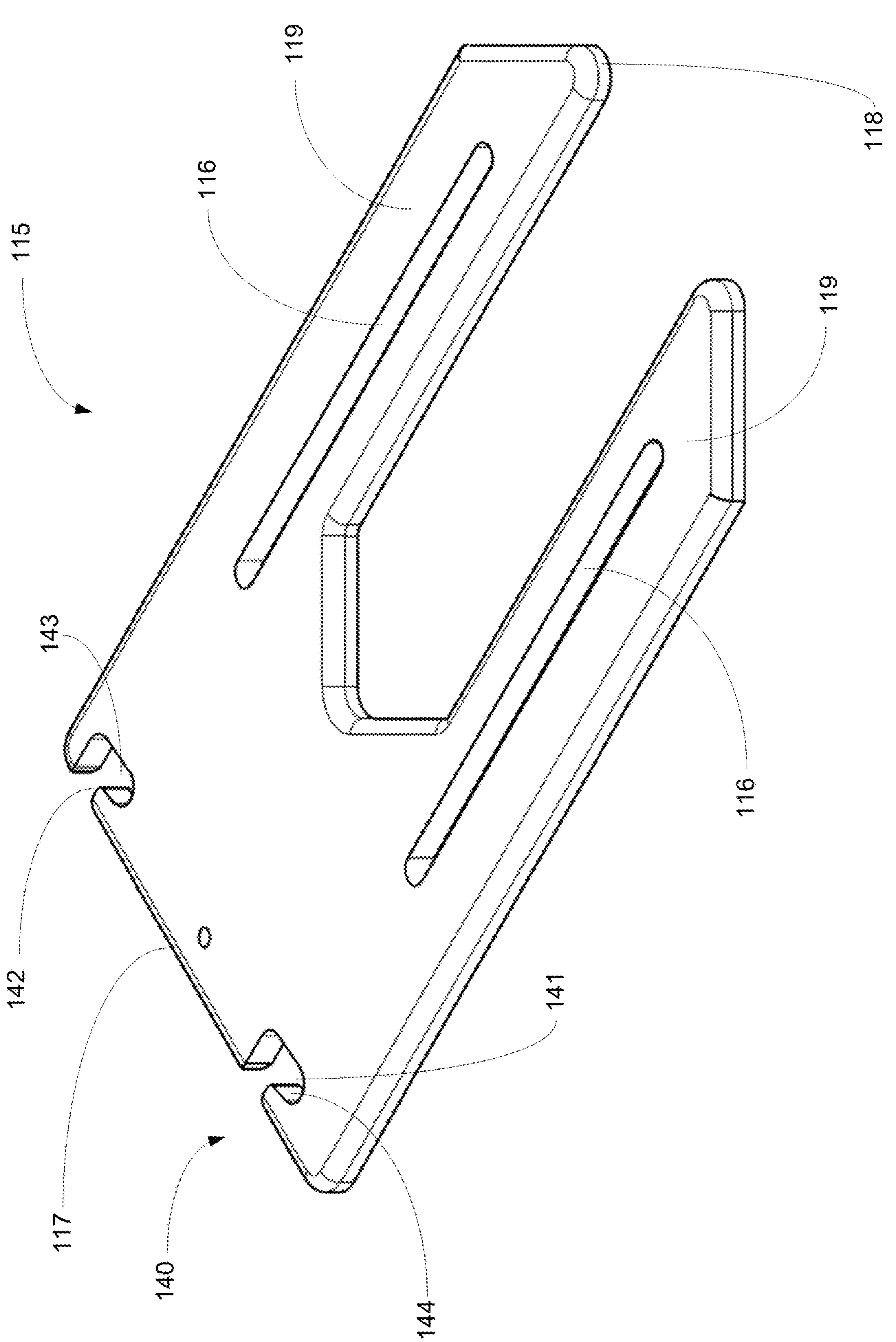
FIG. 4 is a top view of a top plate.
Figure 5:
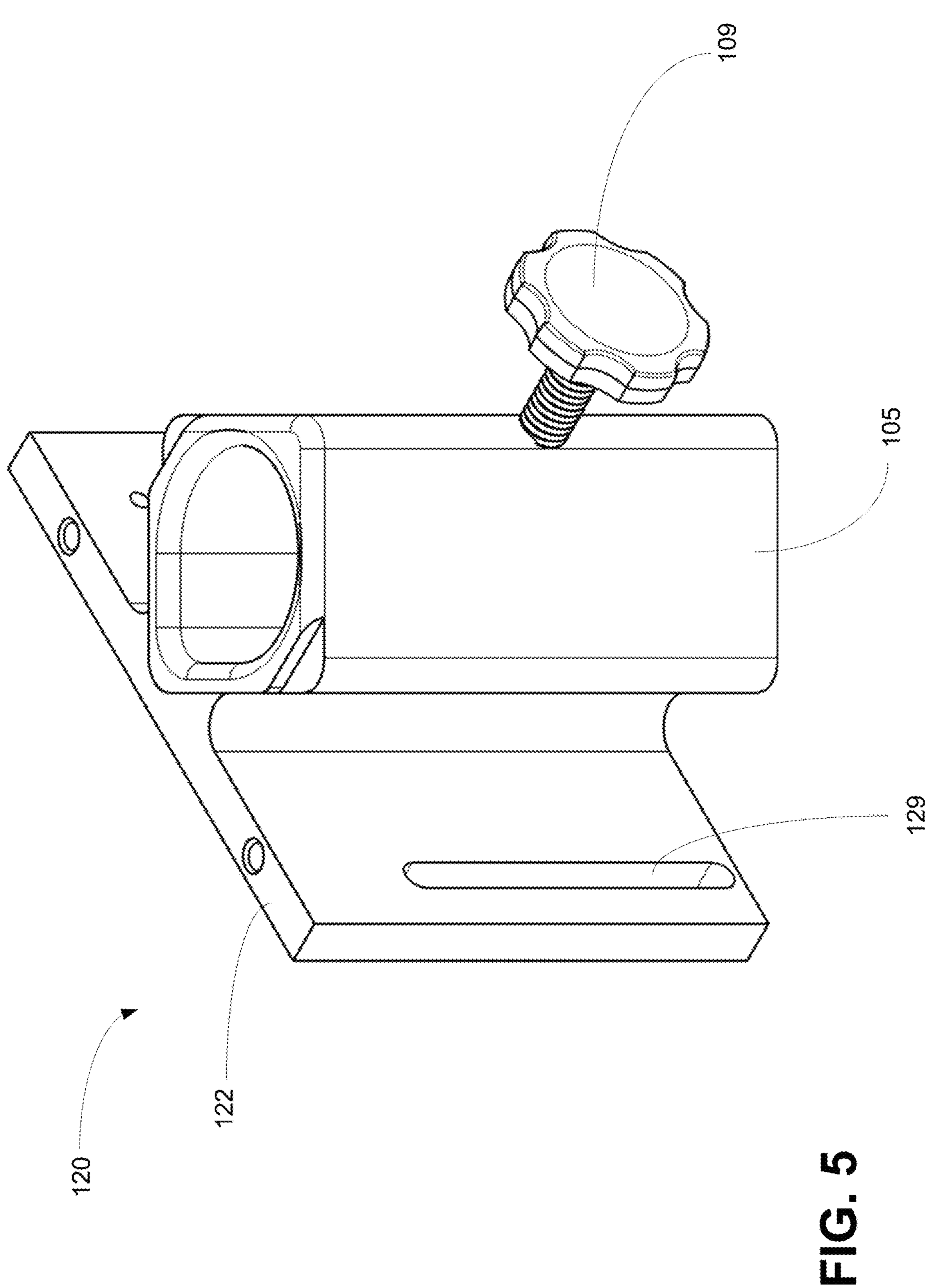
FIG. 5 is a perspective view of a front plate and holder.

Referring to FIG. 4, the at least one top plate slot 116 may extend a portion of the distance between a back edge 117 of the top plate 115 and a front edge 118 of the top plate 115. For example, in some embodiments, the at least one top plate slot 116 may extend from a central portion of the top plate 115 to a position just adjacent of the front edge 118. In certain embodiments, the top plate slot 116 may have a length, for example and without limitation, between one-third and one-half of the distance between the front edge 118 and the back edge 117. In some embodiments, the length of the top plate slot 116 may be greater than half of the distance between the front edge 118 and the back edge 117 and in other embodiments, the length of the top plate slot 116 may be less than one-third of the distance between the front edge 118 and the back edge 117.

In some embodiments, the top plate slot 116 may be oriented such that it extends lengthwise in a direction generally perpendicular to the back edge of the 117 of the front plate 115.

In certain embodiments, the top plate slot 116 may be open at the front edge 118.

The top plate slot 116 may pass through the top plate 115, thereby allowing for the front plate stud 121 to pass through the top plate slot 116. The top plate slot 116 may be of any suitable width so as to allow the front plate stud 121 to pass through the top plate slot 116 and to prevent the front plate tightening head 123 from passing through.

In some embodiments, the at least one top plate slot 116 may comprise multiple slots for engagement with corresponding front plate studs 121. In certain embodiments, there may be two top plate slots 116 in the top plate 115, each for sliding engagement with a corresponding front plate stud 121, such that the at least one front plate stud 121 comprises two front plate studs 121. In some embodiments, there may be more than two top plate slots 116, each for sliding engagement with a corresponding front plate stud 121, with the number of top plate slots 116 being equal to the number of front plate studs 121.

The top plate 115 may be of any suitable size and shape. In some embodiments, the top plate 115 may be a rectangular plate. In certain embodiments, as shown in FIG. 4, the top plate 115 may have a plate portion for bearing against the top surface of the railing 110 and, for example, two arms 119 extending away from the railing 110 on the side of the front plate 120. There may be a gap between the two arms 119 so that the holder 105 or the pole held by holder 105 is not obstructed by the top plate 115. The two arms 119 may include top plate slots 116. The length of the top plate slots 116 in the arms 119 may be determinative of the minimum and maximum widths of railing 110 that the modular apparatus 100 may be attached to. Due to the modular nature of the apparatus 110, the top plate 115 may be switched with different sized top plates 115 for use with even smaller or larger railings 110 than the minimum or maximum widths allowed by the first top plate. This modularity of the modular apparatus 100 and ability to switch out plates for special cases may allow the modular apparatus 100 to be attached to railing like structures such as bleachers, which tend to be much wider than typical railings.

Figure 3:
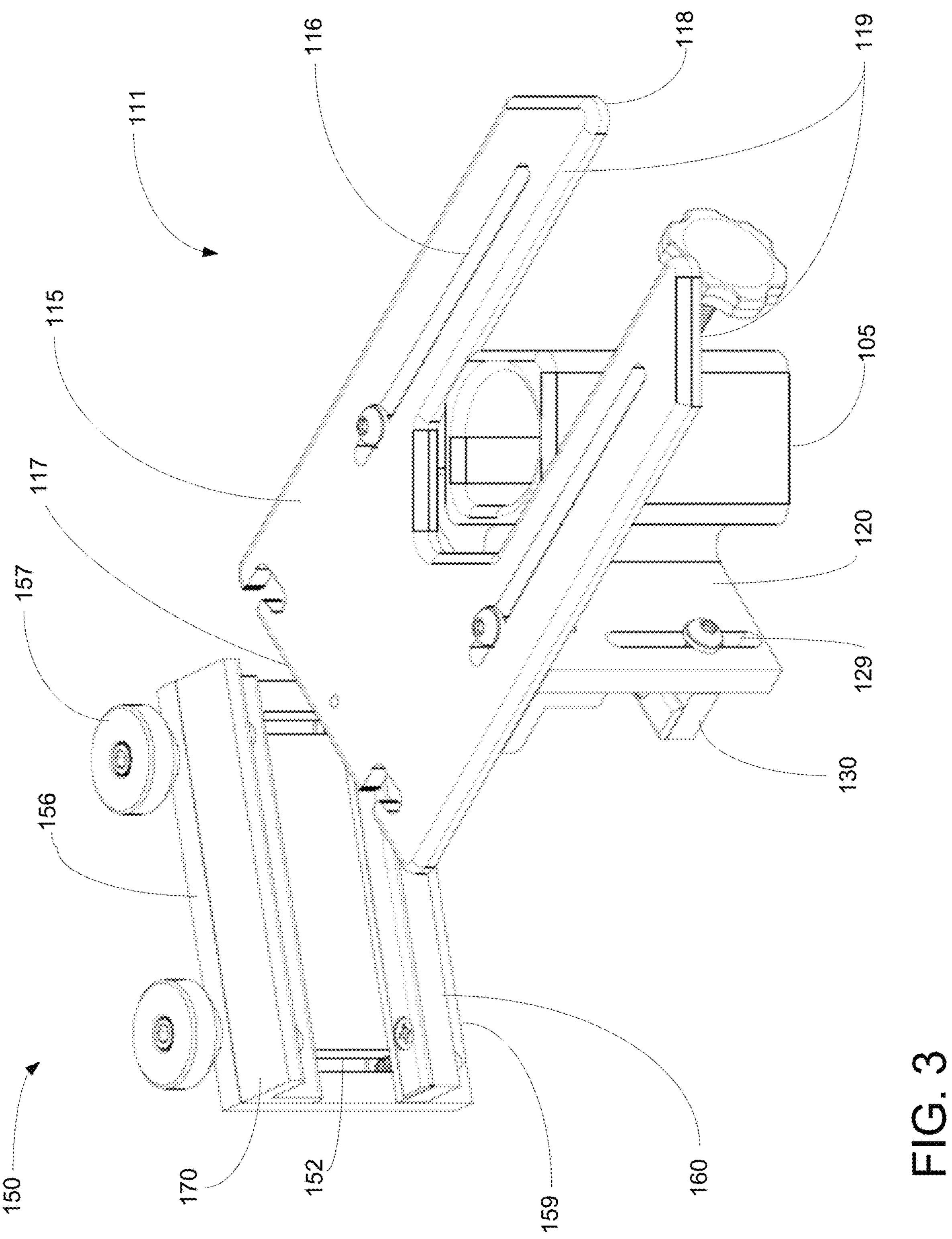
FIG. 3 is a perspective view of an apparatus with the back side disengaged.

Referring to FIG. 3, in some embodiments the J shaped bracket piece 111 may include a front-bottom plate 130 for bearing against a front bottom side of the railing 110. The front-bottom plate 130 may be set in an opposing relation to the top plate 115 such that when the J shaped bracket piece 111 is placed in position around a side of the railing 110, the railing is positioned between the front-bottom plate 130 and the top plate 115.

The front-bottom plate 130 may be of any suitable size and shape. In some embodiments, the front-bottom plate 130, when in position against the railing 110, may only contact a portion of the railing 110. For example, in some embodiments, the front-bottom plate 130 may only contact one-quarter to one-half of the bottom side of the railing 110 when the J shaped bracket piece 111 is in position around a front portion of the railing 110. In certain embodiments, the front-bottom plate 130 may contact less one-third and in some embodiments, the front-bottom plate 130 may contact more than one-half of the bottom side of the railing 100 when the J shaped bracket piece is in position around a front portion of the railing 100.

In some embodiments, the front-bottom plate 130 may be adjustably coupled to the front plate 120 for positioning the front-bottom plate 130 relative to the front plate 120. Any suitable adjustable coupling that allows the front-bottom plate 130 relative to the front plate 120 may be used. In some embodiments, the adjustable coupling between the front plate 120 and the front-bottom plate 130 may comprise a coupling of slots and bolts for sliding engagement of the front-bottom plate 130 relative to the front plate 120, as shown in FIG. 1. For example, in some embodiments, the front plate 120 may include at least one front plate slot 129 extending along a second length of the front plate 120 and oriented in a direction along a line extending from the top plate 115 to the front-bottom plate 130.

In some embodiments, the front-bottom plate 130 may include at least one front-bottom plate stud 131 and front-bottom plate tightening head 133 for engagement with the at least one front plate slot 129 for sliding engagement of the front-bottom plate 130 with the front plate 120 and for locking the front-bottom plate 130 into position relative to the front plate 120.

In some embodiments, the front-bottom plate stud 131 may comprise a rod or bolt corresponding to the front plate slot 129 for engagement with the front plate slot 129. For example, referring again to FIG. 2 and FIG. 3, the front-bottom plate 130 includes at least one front-bottom plate stud 131 extending from a second face 132 of the front-bottom plate 130. The second face 132 may be the side face of the front-bottom plate 130 that faces the front plate 120 when the J shaped bracket piece 111 is in position around the railing 110. The front-bottom plate stud 131 may pass through the front plate slot 129, allowing engagement with the at least one front plate slot 129 such that the front-bottom plate 130 is slidably engaged with the front plate 130. The front-bottom plate stud 131 may comprise a front-bottom plate head 133 at one end for bearing against the front plate 120 for tightening the front-bottom plate 130 into position relative to the front plate 120.

In some embodiments, the second face 132 of the front-bottom plate 130 may have at least one threaded hole and the at least one front-bottom plate stud 131 may be threaded for screwing into the at least one threaded hole. In certain embodiments, the front-bottom plate stud 131 may be a bolt or screw for screwing into the at least one threaded hole in the second face of 132 of the front-bottom plate 130. The bolt head may be shaped for tightening with a wrench or, in some embodiments, may be tightenable with a suitable driver, such as an Alan key or screw driver. Any standard or suitable bolt head or screw head may be used. The threaded hole and the corresponding front-bottom plate stud 131 may be of any suitable size. For example and without limitation, ¼"-20 NC bolts may be used.

In certain embodiments, the front-bottom plate stud 131 may be a stud attached to the second face 132 of the front-bottom plate 130. Any suitable attachment may be used, such as, for example, welding. In some embodiments, the stud may be formed with the front-bottom plate 130 as a single piece. The stud may be of any suitable size. The end of the stud may, in some embodiments, be threaded for receiving a nut.

As in the previous example, in some embodiments, the front-bottom plate head 133 may be a nut for screwing onto a threaded portion of the front-bottom plate stud 131. In some embodiments, where the front-bottom plate stud 131 is not threaded at the end that will engage with the front plate slot 129, a non threaded fastener may be slid over the front-bottom plate stud 131 and used to hold the front-bottom plate 130 tight against the front plate 120. Any suitable non threaded fastener may be used in these embodiments, including, for example and without limitation, self locking stud receivers, speed nuts and spring rings.

In some embodiments, the front plate slot 129 may be oriented such that it extends lengthwise in a direction generally perpendicular to the bottom face of the front plate 115.

In certain embodiments, the front plate slot 129 may be open at the bottom edge 119.

The front plate slot 129 may pass through the front plate 120, thereby allowing for the front-bottom plate stud 131 to pass through the front plate slot 129. The front plate slot 129 may be of any suitable width so as to allow the front-bottom plate stud 131 to pass through the front plate slot 129 and to prevent the front-bottom plate head 133 from passing through.

In some embodiments, the at least one front plate slot 129 may comprise multiple slots for engagement with corresponding front-bottom plate studs 131. In certain embodiments, there may be two front plate slots 129 in the front plate 120, each for sliding engagement with a corresponding front-bottom plate stud 131, such that the at least one front-bottom plate stud 131 comprises two front-bottom plate studs 131. In some embodiments, there may be more than two front plate slots 129, each for sliding engagement with a corresponding front-bottom plate stud 131, with the number of front plate slots 129 being equal to the number of front-bottom plate studs 131.

Referring again to FIG. 1, in some embodiments, the J shaped bracket piece 111 may be coupled to the first side of the railing 110 by placing the top plate 115 onto the top of the railing 110 and adjusting the position of the front plate 120 to bear against the front side of the railing 110 and the position of the front-bottom plate 130 to bear against the front bottom side of the railing 110.

Referring to FIG. 4, the top plate 115 may include at least one tapered L-slot 140. In some embodiments, the at least one tapered L-slot 140 may have a first leg 141 running adjacent to a back edge 117 of the top plate 115. The back edge 117 of the top plate 115 may be distal to the front plate 120 when the J shaped bracket piece 111 is in position around a side of the railing 110. In some embodiments, the at least one tapered L-slot 140 may have a second leg 142 opening out at the back edge 117 of the top plate 115. In certain embodiments, the first leg 141 and the second leg 142 of the tapered L-slot 140 may form a continuous curve. In some embodiments, each of the first leg 141 and the second leg 142 may be straight. In these embodiments, the juncture of the first leg 141 and the second leg 142 may have leg walls that meet at sharp corners or, in some embodiments, the sharp corners may be replaced with chamfers or fillets.

The first leg 141 may have any suitable length. In some embodiments, the first leg 141 may be less than one third of a total length of the back edge 117 of the top plate 115. For example and without limitation, in certain embodiments, the first leg 141 may be about between ½" to 1¼" long.

Referring to FIG. 4, in some embodiments, the second leg 142 may be oriented in a direction generally perpendicular to the back edge 117 of the top plate 115. The second leg 142 may have any suitable length for having the second leg 142 stretch from the back edge 117 of the top plate 115 to a first end 143 of the first leg 140. For example and without limitation, in some embodiments, the second leg 142 may have a length of about between ⅕" to ½".

Referring again to FIG. 4, in some embodiments, the first leg 141 may be tapered such that the first end 143 of the first leg 141 is closer to the back edge 117 of the top plate 115 than a second end 144 of the first leg 141, where the first end 143 of the first leg 141 may be adjacent to the second leg 142 of the at least one tapered L-slot 140. In these embodiments, the term taper may refer to the first leg 141 being angled relative to the back edge 117 of the top plate 115. An angle between a wall of the first leg 141 and a line parallel with the back edge 117 of the top plate 115 that crosses the wall of the first leg 141 may be of any suitable size. For example and without limitation, in some embodiments, the angle may be between about 2 degrees and 15 degrees.

In some embodiments, the first leg 141 may have a non-linear or curved taper relative to the back edge 117 of the top plate 115. In some of these embodiments, the slope may be greater adjacent to the second leg 142 and may decrease along the length of the first leg 141.

In some embodiments, the tapered L-slot 140 may pass completely through the depth of the top plate 115.

Referring to FIG. 2, in some embodiments, the modular apparatus 100 may include a back piece 150. The back piece 150 may include a back plate 151 for bearing against a back side of the railing 110. The back piece 150 may also include a back-bottom plate 160 for bearing against a back bottom of the railing 110. In some embodiments, the back-bottom plate 160 may be adjustably coupled to the back plate 151 for positioning the back-bottom plate 160 relative to the back plate 151. In certain embodiments, the back-bottom plate 160 may be coupled to the back plate 151 similarly to how the front-bottom plate 130 is coupled to the front plate 120, as described in the preceding paragraphs.

Any suitable adjustable coupling that allows adjustment of the position of the back-bottom plate 160 relative to the back plate 151 may be used. In some embodiments, the adjustable coupling between the back plate 151 and the back-bottom plate 160 may comprise a coupling of slots and bolts for sliding engagement of the back-bottom plate 160 relative to the back plate 151, as shown in FIG. 2 and FIG. 4. For example, in some embodiments, the back plate 151 may include at least one back plate slot 152 extending along a fourth length of the back plate 151 and oriented in a direction along a line extending from the top plate 115 towards the back-bottom plate 160.

In some embodiments, the back-bottom plate 160 may include at least one back-bottom plate stud 161 and tightening head 163 combination for engagement with the at least one back plate slot 152 for sliding engagement of the back-bottom plate 160 with the back plate 151 and for locking the back-bottom plate 160 into position relative to the back plate 151.

In some embodiments, the back-bottom plate stud 161 may comprise a rod or stud for corresponding engagement with the front plate slot 129. For example, referring again to FIG. 2, the back-bottom plate 160 includes at least one back-bottom plate stud 161 extending from a back-bottom plate second face 162 of the back-bottom plate 160. The back-bottom plate second face 162 may be a face of the back-bottom plate 160 that faces the back plate 151 when the modular apparatus 100 is in position around the railing 110. The back-bottom plate stud 161 may pass through the back plate slot 152, allowing engagement with the at least one back plate slot 152 such that the back-bottom plate 160 is slidably engaged with the back plate 160. The back-bottom plate stud 161 may comprise a back-bottom plate tightening head 163 at one end for bearing against the back plate 151 for tightening the back-bottom plate 160 into position relative to the back plate 151.

In some embodiments, the back-bottom plate second face 162 of the back-bottom plate 160 may have at least one threaded hole and the at least one back-bottom plate stud 161 may be threaded for screwing into the at least one threaded hole. In certain embodiments, the back-bottom plate stud 161 may be a bolt or screw for screwing into the at least one threaded hole in the back-bottom plate second face 162. In these embodiments, the bolt or screw head may be the back-bottom plate tightening head 163. The bolt or screw head may be shaped for tightening with a wrench or, in some embodiments, may be tightenable with a suitable driver, such as an Alan key or screw driver. Any standard or suitable bolt head or screw head may be used. The threaded hole and the corresponding back-bottom plate stud 161 may be of any suitable size. For example and without limitation, in some embodiments, ¼"-20 NC bolts may be used.

In certain embodiments, the back-bottom plate stud 161 may be a stud permanently attached to the back-bottom plate second face 162. Any suitable attachment may be used, such as, for example, welding. In some embodiments, the back-bottom plate stud 161 may be formed with the back-bottom plate 160 as a single piece. The back-bottom plate stud 161 may be of any suitable size. The end of the back-bottom plate stud 161 may, in some embodiments, be threaded for receiving a nut. In these embodiments, the nut may be the back-bottom plate tightening head 163.

As in the previous example, in some embodiments, the back-bottom plate tightening head 163 may be a nut for screwing onto a threaded portion of the back-bottom plate stud 161. In some embodiments, where the back-bottom plate stud 161 is not threaded at the end that will engage with the back plate slot 152, a non threaded fastener may be slid over the back-bottom plate stud 161 and used to hold the back-bottom plate 160 tight against the back plate 160. Any suitable non threaded fastener may be used in these embodiments, including, for example and without limitation, self locking stud receivers, speed nuts and spring rings.

In some embodiments, the at least one back plate slot 152 may extend along a length of the back plate and may be oriented in a second vertical direction. The second vertical direction may be directed along a line extending from a back edge of the top plate 115 to the back-bottom plate 160. In other words, the back plate slot 152 may be oriented such that it extends along a portion of the length of the back plate 151 in a direction generally perpendicular to the bottom edge 159 of the back plate 151.

In certain embodiments, the back plate slot 152 may be open at the back-plate bottom edge 159. In other embodiments, the length of the back plate slot 152 may be contained within the back-plate 152.

The back plate slot 152 may be of any suitable length. The overall length of the back plate slot 152, and of all other similar slots discussed in the present description, may be dependent on the overall dimensions of the modular apparatus 100. The modular apparatus 100 may be produced in various sizes to fit different sized railings, with the various sizes of modular apparatus 100 using different slot lengths. The relatively long slots of the modular apparatus 100, whether they be back plate slots 152, front plate slots 129 or top face slots 116, may allow greater flexibility in the size of railings a modular apparatus 100 may be used with.

In some embodiments, the back plate slot 152 may be between one-quarter and one-half of the overall length of the back plate 151. In certain embodiments, the back plate slot 152 may be less than one-quarter of the overall length of the back plate 151. In other embodiments, the back plate slot 152 may be greater than one-half of the overall length of the back plate 151.

In some embodiments, the back plate slot 152 may pass through the back plate 151, thereby allowing for the back-bottom plate stud 161 to pass through the back plate slot 152. The back plate slot 152 may be of any suitable width so as to allow the back-bottom plate stud 161 to pass through the back plate slot 152 and to prevent the back-bottom plate tightening head 163 from passing through.

In some embodiments, the at least one back plate slot 152 may comprise multiple slots for engagement with corresponding back-bottom plate studs 161. In certain embodiments, there may be two back plate slots 152 in the back plate 160, each for sliding engagement with a corresponding back-bottom plate stud 161, such that the at least one back-bottom plate stud 161 comprises two back-bottom plate studs 161. In some embodiments, there may be more than two back plate slots 152, each for sliding engagement with a corresponding back-bottom plate stud 161, with the number of back plate slots 152 being equal to the number of back-bottom plate studs 161.

The back plate 151 may further include at least one stud extension 155 extending from a back-plate top face 156 for engagement with the at least one tapered L-slot 140. Any suitable type of stud extension 155 may be used. In some embodiments, the stud extension 155 may be a bolt, stud, or screw screwed into a threaded hole in the back-plate top face 156. In certain embodiments, the at least one stud extension 155 may be permanently fixed to the back plate 151. For example and without limitation, the at least one stud extension 155 may be welded to the back-plate top face 156.

The back plate 151 may also include a back plate tightening head 157 coupled with the at least one back plate stud extension 155 for tightening against the top plate 115. Any suitable type of tightening head 157 may be used. For example, in some embodiments, the back plate tightening head 157 may be a nut style for threading onto the end of the at least one stud extension 155. In these embodiments, the nut style back plate tightening head 157 may be a nut for tightening with a wrench. In some embodiments, the nut style back plate tightening head 157 may have a shape and size suitable for hand tightening. In certain embodiments, the nut style back plate tightening head 157 may be a cap or knob for hand tightening onto the stud extension 155. In these embodiments, a central portion of the cap or knob that includes internal threads for screwing onto the stud extension 155 may be of a length sufficient to receive the entire lengths of the stud extension 155 protruding above the top plate 115 when the modular apparatus 100 is attached to a railing 100.

In some embodiments, the back plate tightening head 157 may be part of the stud extension 155, such as, without limitation, a bolt head. In these embodiments, the stud extension 155 may be screwed into a threaded hole in the back-plate top face 156. The bolt head may be of any suitable size or shape. For example, in some embodiments, the bolt head may be a knob for hand tightening.

As set forth in the previous examples, in some embodiments, the back plate tightening head 157 may be a knob or handle to allow for hand tightening rather than tightening with tools. The knob may be of any suitable size and shape to allow for hand tightening.

The back plate tightening head 157 may be formed of any suitable material. For example and without limitation, the back plate tightening head 157 may be formed of metal or plastic. In some embodiments, the back plate tightening head 157 may be made of both plastic and metal. For example, the threaded portion of the back plate tightening head 157 may be formed of a suitable metal. In these embodiments, the metallic threaded portion may be surrounded by a plastic material. The plastic material may form a handle or a knob to allow for hand tightening of the back plate tightening head 157.

In some embodiments, the back plate tightening head 157 may be tightened to bear against the top plate 115 to hold the back piece 150 in a first position. The first position may be a position where the stud extension 155 is positioned at the first end 143 of the first leg 141. The back plate tightening head 157 may be further tightened to bear against the top plate 115 at a locked final position after the back piece 150 is slid relative to the top plate 115 for moving the stud extension 155 into the locked final position. The locked final position may be a position of the back piece 150 where the stud extension 155 is positioned at the second end 144 of the first leg 141. At the locked final position of the back piece 150, the modular apparatus 100 may be locked into its final position onto the railing 110.

In use, the back plate 151 may be pushed against the railing 110 such that the stud extension 155 moves through the second leg 142 of the tapered L-slot 140 into the first end 143 of the first leg 141. The back plate tightening head 157 may be slightly tightened to hold the back plate 151 in position. The back plate 151 may then be slid relative to the top plate 115 such the stud extension 155 is moved from the first position to the locked final position. Due to the taper of the first leg 141, the back plate 151 and the top plate 115 are pulled together, tightening the modular apparatus 100 around the railing 110. The back plate tightening head 157 may then be further tightened to hold or lock the back plate 151 into position relative to the top plate 115 and thereby locking the modular apparatus 100 around the railing 110.

Referring again to FIG. 4, in some embodiments, the top plate 115 may include more than one tapered L-slot 140. The top plate 115 may include any suitable number of tapered L-slots 140. Each of the tapered L-slots 140 may be matched by corresponding stud extensions 155 on the back plate 151, with the number of tapered L-slots 140 being equal to the number of corresponding stud extensions 155. In certain embodiments, the there may be two tapered L-slots 140 in the top plate 115 and two corresponding stud extensions 155 in the back plate 151.

Having multiple tapered L-slots 140 with the matching number of stud extensions 155 for engagement with the multiple tapered L-slots 140 may be beneficial in some embodiments by providing a more secure fit of the modular apparatus 100 around the railing 110 than with the use of a single tapered L-slot 140. Additionally, having multiple tapered L-slots may be beneficial by distributing the stresses on the stud extensions 155.

The various components of the modular apparatus 100 may have any suitable dimensions based on the size of the holder 105 and the railing 110. For example and without limitation, the thickness of the various plates of the apparatus 100 may be between about ¼" and ½". In certain embodiments, the thickness of the various plates of the apparatus 100 may be about ⅜".

For example and without limitation, in some embodiments, the width of the top plate 115 may be between about 4" and 6" the length of the top plate 115 may be between about 10" to 12". The front plate 120 may be between about 4" to 6" wide (with width representing the distance the front plate 120 will extend along a length of the railing 110 when installed) and between about 3½" to 5" high (from top to bottom when installed on the railing 110). The back plate 151 may be similarly sized as the front plate 120 in some embodiments. The front-bottom plate 130 and the back-bottom plate 160 may each be between about 3" to 5" long and ½" and 1½" wide.

In some embodiments, each of the front-bottom plate 130 and the back-bottom plate 160 may be sized such that the portion of each of the front-bottom plate 130 and the back-bottom plate 160 that bears against the underside of the railing 110 only contact a small portion of a front edge and back edge respectively of the railing 110. For example, in some embodiments, each of the front-bottom plate 130 and the back-bottom plate 160 only contact or bear against about between a quarter inch to one and a half inch of the underside of the railing 110. The above dimensions for the various components of the modular apparatus 100 are for some embodiments and do not limit the dimensions of components in other embodiments.

In some embodiments, there may be a gap between the front-bottom piece and the back-bottom piece when the modular apparatus 100 is in position around the railing 110. Having a gap at between the front-bottom piece and the back-bottom piece underneath the railing 110 may be beneficial for fitting the modular apparatus 100 around different types of railings. For example, the gap between the front-bottom piece and the back bottom piece may allow space for spindles extending down from the railing 110. Additionally, each of the front-bottom piece and the back bottom piece may be positioned at different elevations relative to the ground or the railing 100 depending on the railing type. The modular design of the modular apparatus 100, with each of the pieces of the apparatus being coupled together while positioning the modular apparatus 100 around the railing 110, allows for great flexibility in configuring the modular apparatus 100 to fit around the railing 100.

The thicknesses of the components of the modular apparatus 100 may be based on strength and weight considerations. In some embodiments, such as a modular apparatus 100 for use with a medium sized backyard umbrella, steel plates with thicknesses of about a quarter inch may be used for the various components of the modular apparatus 100. These thicknesses may be greater or smaller depending on the potential weight of the items the particular apparatus may be designed for, the materials being used and the size of the railing 110.

Any of the top plate 115, the back plate 151, the front plate 120, the front back plate 130 and the back bottom plate 160 may be shaped as, without limitation, plates, rods, bars or any combination thereof. They may be straight or curved. In some embodiments, they may include cut-outs. For example, the top piece 115 may have cut-outs to reduce the weight of the apparatus or as an ornamental design. Any of the aforementioned plates may be formed of a framework of bars or rods.

The components of the modular apparatus 100 may be formed of any suitable or combination of suitable materials. Materials such as, for example and without limitation, metals including aluminum and steel, plastic, wood and composites, including carbon-fiber based materials and fibreglass, may be used.

Referring again to FIG. 1, in some embodiments, any of the top plate 115, the back plate 151, the front plate 120, the back-bottom plate 160 and the front-bottom plate 130 may comprise at least one replaceable pad 170 attached to a bearing surface of each of the top plate 115, the back plate 151, the front plate 120, the back-bottom plate 160 and the front-bottom plate 130 for engagement with the railing 110. The at least one replaceable pad 170 may be comprised of a material that is softer than the material of its corresponding top plate 151, back plate 151, front plate 120, back-bottom plate 160 or front-bottom plate 130 for gripping the railing 110.

In some embodiments, the at least one replaceable pad 170 attached to the bearing surface of the back plate 151 and the back-bottom plate 160 may have a lower friction coefficient than the back plate 151 or the back-bottom plate 160 for increasing the slidability of the back plate 151 and back-front plate 160 against the railing 110 relative to the slidability of the back plate 151 and back-front plate 160 without the at least one replaceable pad 170.

In certain embodiments, multiple replaceable pads 170 may be attached to each or any of the top plate 115, the back plate 151, the front plate 120, the back-bottom plate 160 and the front-bottom plate 130. For example, in some embodiments, a single replaceable pad 170 may be attached to the bearing surface of the back plate 151 while in other embodiments, the single replaceable pad may be replaced with two or more replaceable pads 170 attached to the bearing surface of the back plate 151.

In some embodiments, as shown in FIG. 2, the replaceable pad 170 on a top edge portion of each of the front plate 120 and the back plate 151 may be shaped as a corner bracket. One wall of the replaceable pad 170 may be attached to the front plate 120 or the back plate 151 and the second wall may extend perpendicularly from the front plate 120 or the back plate 151 for pressing against a top of the railing 110. The top plate 115 may then be pressed against the second walls of the corner bracket shaped replaceable pads 170 of the back plate 151 and the front plate 120. In these embodiments, the top plate 115 may not have replaceable pads 170 attached to it as the corner bracket shaped replaceable pads 170 of the front plate 120 and the back plate 151 may perform a similar function as replaceable pads 170 attached to the top plate 115 would perform. Having a configuration with corner bracket replaceable pads attached to the back plate 151 and the front plate 120 may decrease production costs as less pads may need to be attached to plates.

As discussed above, in certain embodiments, the replaceable pad pieces 170 may be formed of a softer material than the component it is attached to, thereby reducing the possibility of damage, such as scratches, to the railing 110. The replaceable pad pieces 170 may also, in some embodiments, be formed of a material with a greater grip than the components they are attached to. The replaceable pad pieces 170 may be coupled to components of the modular apparatus 100 to reduce direct contact between these components and the railing 110.

The greater compressibility of the replaceable pad pieces 170 relative to the back plate 151, the front plate 120 and the railing 110 may also be advantageous when sliding the back plate 151 relative to the top plate 115 into the final locked position. The sliding action may pull the back plate 151 and the front plate 120 closer together, removing play between the plates the railing 100 and squeezing the railing 110 between the plates. Assuming a snug fit between the railing 110, the back plate 151 and the front plate 120 prior to the sliding of the back plate 151 relative to the top plate 115, the sliding action may cause the replaceable pad pieces 170 to compress more so than the other parts, making the sliding action easier to execute for a user than if there were no replaceable pad pieces 170. This compressibility of the replaceable pad pieces 170 may also act as a further safety feature by reducing the possibility of compression damage to the railing 110.

Any suitable coupling technique may be used to attach the replaceable pad pieces 170 to the other components of the modular apparatus 100. For example, the replaceable pad pieces 170 may be attached to the other components of the modular apparatus 100 using, without limitation, screws, bolts, rivets or adhesives. The replaceable pad pieces 170 may also be friction fit into corresponding spaces on the other components of the modular apparatus 100. In some embodiments, the replaceable pad pieces 170 may include tabs or extruding pieces for engaging with slots, holes, notches, or other cutouts to hold the replaceable pad pieces 170 in place.

An advantage of having replaceable pad pieces 170 may include the ability to swap out different types of pads for different types of railings. Different types of materials may be used for different types of railings, such as using softer materials, materials with higher friction coefficients or in some cases, materials with lower friction coefficients. Pads with shapes to complement railing shapes, such as pads with concave portions, may be used as replacement pads in some embodiments. In some embodiments, thicker or thinner pads may be used as replacement pads. The ability to replace worn out or damaged pads may also be advantageous.

Figure 8:
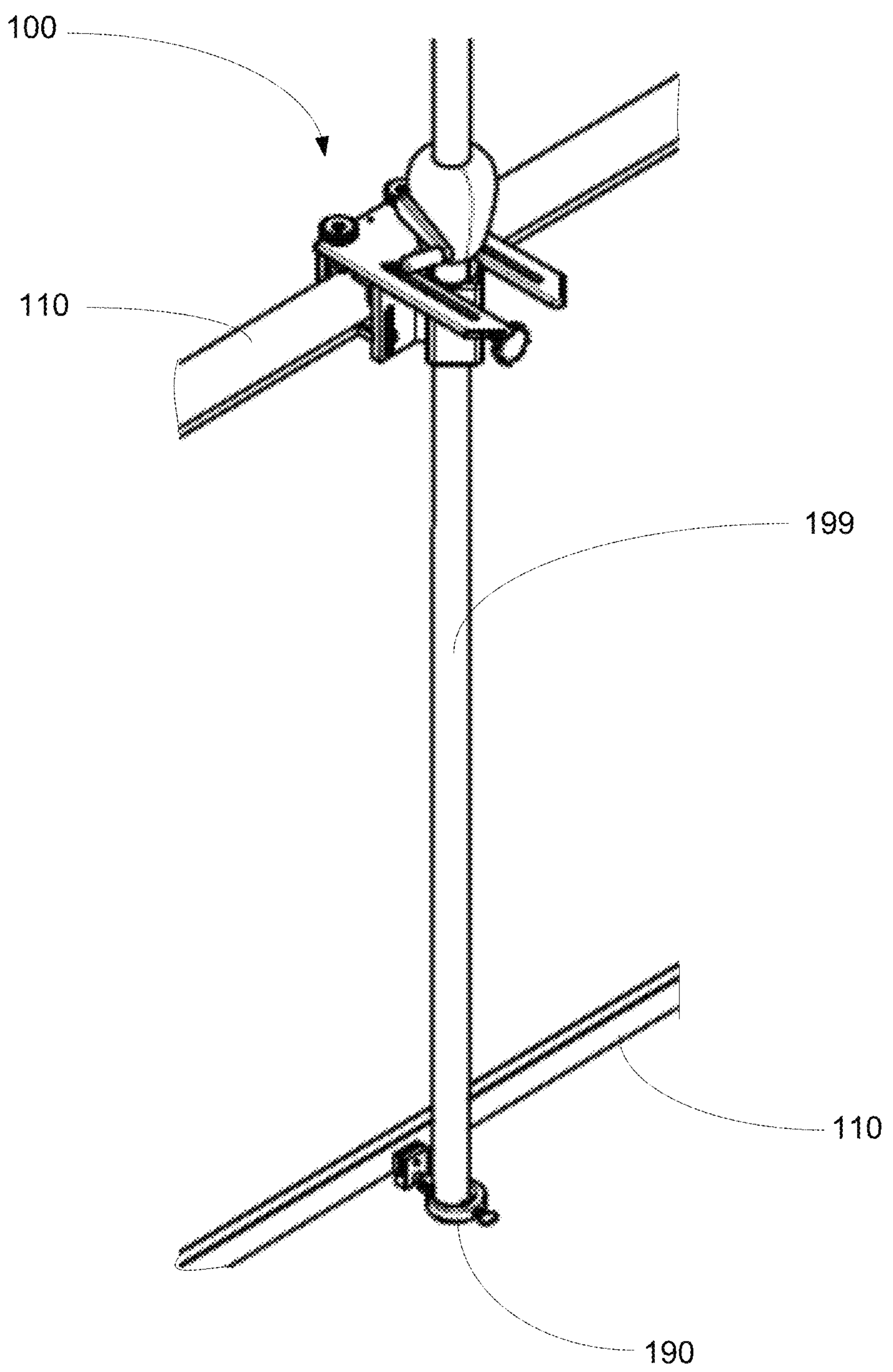
FIG. 8 is a perspective view of the apparatus with a bottom bracket.
Figure 9:
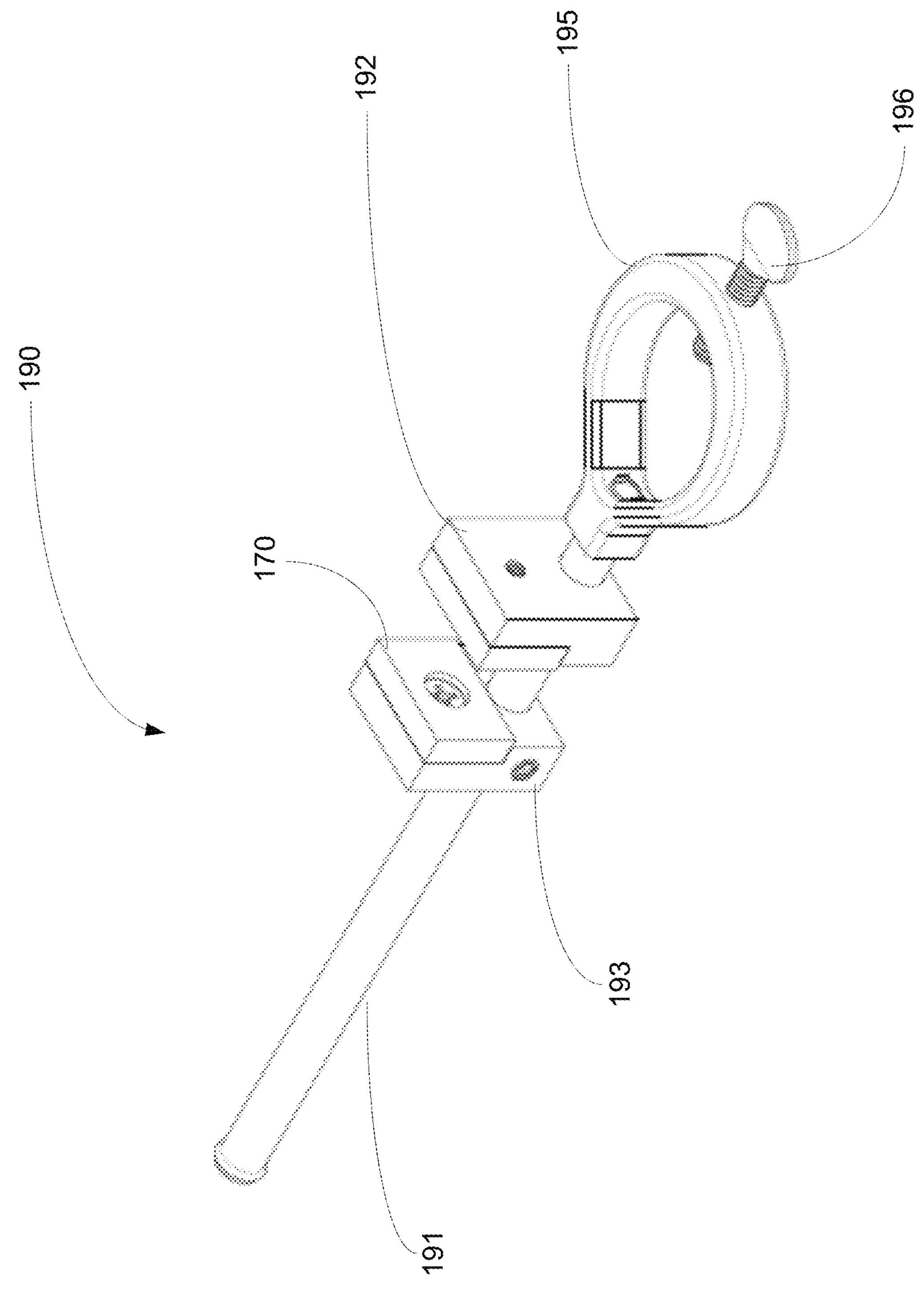
FIG. 9 is a perspective view of a bottom bracket.

Referring to FIG. 8 and FIG. 9, an embodiment of the apparatus 100 of claim 1 that includes a bottom bracket 190 is shown. In some embodiments, the bottom bracket 190 may be for coupling to the railing 110 from a position underneath the railing 110. Whereas the parts of the apparatus 100 disclosed above may attach to a top rail of the railing 110, the bottom bracket 190 may attach to a bottom portion of the railing 110.

In some embodiments, the bottom bracket 190 may include a rod 191 for passing underneath the railing 110 in a direction perpendicular to a first direction where the first direction may be a direction oriented along a length of the railing 110 (or in other words, in a direction that is parallel to a longitudinal axis of the railing 110). In certain embodiments, the rod 191 may have coupled to it a front wall piece 192 and a back wall piece 193 for clamping onto the bottom portion of the railing 110. In some embodiments, the back wall piece 193 may be slid onto and along the rod 191 to bear against the back side of the bottom portion of the railing 110 and locked in position for clamping the bottom portion of the railing 110 between the back wall piece 193 and the front wall piece 192 when the apparatus 100 is in an installed position on the railing 110.

In some embodiments, the bottom bracket 190 may include a front wall piece 192 coupled to the rod 191 for bearing against a front side of the bottom portion of the railing 110. The front wall piece 192 may be coupled to the rod 191 at a bottom part of the front wall piece 192. The rod 191 may pass through the front wall piece 192 and be attached to the front wall piece 192 using any suitable fastening. For example and without limitation, the front wall piece 192 may be attached to the rod 191 using a friction fit. In some embodiments, the front wall piece 192 may be attached to the rod 191 using, as an example and without limitation, set screws, welds, or adhesives.

The front wall piece 192 may be attached to the rod 191 adjacent to a first rod end of the rod 191. In use, the front wall piece 192 would be positioned on the same side of the railing 110 as the holder 105.

In some embodiments, the bottom bracket may include a back wall piece 193 for sliding onto and along the rod 191 relative to the front wall piece 191 and bearing against a back side of the bottom portion of the railing 110. The back wall piece 193 may be moved against the back side of the bottom portion of the railing 110 and locked into place to clamp the bottom portion of the railing 110 between the back wall piece 193 and the front wall piece 192. Any suitable locking mechanism may be used to reversibly lock the back wall piece 193 into position. For example, and without limitation, in some embodiments, one or more set screws may be used to lock the back wall piece 193 into position. The back wall set screws may, in some embodiments, be hand tightenable, having largened heads or knobs for hand tightening. In certain embodiments, fasteners such as locking nuts or locking collars may be used to reversibly lock the back wall piece 193 into position.

The back wall piece 193, in some embodiments, may be slidably coupleable to the rod 191 at a bottom portion of the back wall piece 193. Each of the back wall piece 193 and the front wall piece 192 may have any suitable size and shape for clamping the bottom portion of the railing 110 between them. For example and without limitation, in some embodiments, each of the front wall piece 192 and the back wall piece 193 may be rectangular in shape. Each of the front wall piece 192 and the back wall piece 193 may have dimensions of about, for example and without limitation, 1⅛" long by 1⅛" wide and a thickness between about 3/16" and 9/16".

In some embodiments, replaceable pad pieces 170 may be attached to the bearing surfaces of each of the back wall piece 193 and the front wall piece 191. Any suitable layout of the replaceable pad pieces 170 may be used.

Referring again to FIG. 9, in some embodiments, the bottom bracket 190 may also include a bottom collar 195 coupled to the rod 191 at the first rod end of the rod 191, the first rod end being distal to the back wall piece 193 and proximal to the front wall piece 192. The collar 195 may be for holding a bottom portion of the pole 199. The collar 195 may include a collar set screw 196 for tightening through a wall of the collar 195 and against the pole for securing the pole. The collar set screw 196 may have any suitable size and shape for securing the pole in the collar 195. In some embodiments, the head of the collar set screw 196 may be enlarged for hand tightening. For example, and without limitation, the head of the collar set screw may be a knob or, as shown in FIG. 8, a disk, for hand tightening.

The collar 195 may be coupled to the rod 191 using any suitable coupling. For example, and without limitation, the collar 195 may be screwed onto the rod 191, welded to the rod 191, slid over an end of the rod 191 and held in place with set screws or adhesives or may be formed as a single piece with the rod.

The collar 195 may have any suitable size and shape for holding the pole. In some embodiments, the width or diameter and the shape of the collar 195 may match or be similar to the width or diameter and the shape of the holder 105.

The rod 191 may be of any suitable size. For example, and without limitation, in some embodiments, the rod 191 may have a length of about 12". In some embodiments, the rod 191 may have a length less than 12".

In some embodiments, locking the back wall piece 193 against the back side of the bottom portion of the railing 110 and holding a bottom portion of the pole in the bottom collar 195 may be for reducing torque of the apparatus 100 on the railing 110. Torque may be created by the pole hanging over one side of the railing 110. A breeze or wind may, in some situations, create a torque in the opposite direction. With the bottom bracket 190 installed, the apparatus 100 may resist rotation around the railing 110 in either direction.

In some embodiments, the apparatus 100 may include the bottom bracket 190. In certain embodiments, the apparatus 100 may be used without the bottom bracket 190. An advantage to using the bottom bracket 190 may be, in some embodiments, the reduction of the possibility of the apparatus 100 rotating around the top rail of the railing 110. By holding the pole in the collar 195 and having the collar 195 coupled to the railing 110 through the rod 191 and the front and back wall pieces 192, 193, the possibility of rotation is reduced in either direction around the top rail. For railings 110 with a round top rail, the reduction of the possibility of the apparatus 100 rotating around the top rail may be more apparent than with non-round top rails.

An additional advantage of the bottom bracket 190 may be that it couples to the railing 110 from underneath the railing 110. For railings with a small clearance underneath, the rod 191 of the bottom bracket 190 may be passed underneath the railing 110 and positioned so that the front wall piece 192 is pushed against the bottom part of the front of the railing 110. The back wall piece 193 may then be slid onto the rod 191 from the back side of the railing 110 and slid along the rod 191 until it is pushed up against the back side of the railing 110 and then locked into position. The pole may then be placed in the holder 105 and the collar 195. The bottom bracket 190 may be coupled to the top part of the apparatus 100 through the pole.

In use, when attaching the modular apparatus 100 to a railing 110, in accordance with certain embodiments, the top plate 115 may first be placed on a top surface of the railing 110. The back plate 151 may then be hung from the top plate 115 by screwing the stud extensions 155 through the tapered L-slots 140 and into threaded holes in the back-plate top face 156. The back plate tightening head 157 may be slightly tightened to hold the back plate 151 against the top plate 115. Each of the stud extensions 155 may be positioned at the first end 143 of the first leg 141 of their corresponding tapered L-slot 140 such that the stud extension 155 is adjacent to a wall of the first leg 141 that is distal, with respect to the other wall of the first leg 141, to the railing 110. The position of the back plate 151, now attached to the top plate 115, may be adjusted to have the back plate 151 bear against a back side of the railing 110.

Once the back plate 151 is pushed against the back side of the railing 110 and coupled to the top plate 115, the front plate 120 may be coupled to the top plate 115. The front plate may be pushed against a front side of the railing 110 and front plate studs 121 may be passed through the top plate slots 116 and screwed into holes in the front plate. The top plate 115 may be pulled towards the front plate 120, with at least a portion of the front plate 120 pushed against the front side of the railing 110, such that at least a portion of the back plate 151 is bearing against the back side of the railing 110. The front plate studs 121 may then be tightened to hold the front plate 120 tightly against the top plate 115.

Once the front plate 120 is positioned and locked in place by tightening the front plate studs 121, the front-bottom plate 130 may be attached. The front-bottom plate 130 may be positioned against a front bottom portion of the railing 110. The front bottom plate 130 may be positioned such that the front-bottom plate studs 131 may pass through the front plate slots 129. Once the front-bottom plate 130 is positioned, the front-bottom plate head 133 of each front bottom plate stud 131 may be tightened to bear against a front face of the front plate 120.

Once the back plate 151 has been attached to the top plate 115, the back-bottom plate 160 may be attached to the back plate 151. The back-bottom plate 160 may be positioned against a back bottom portion of the railing 110. The back-bottom plate 160 may be positioned such that the back-bottom plate studs 161 may pass through the back plate slots 152. Once the back-bottom plate 160 is positioned so that the railing 110 is held tightly between the back-bottom plate 160 and the top plate 115, the back-bottom plate tightening head 163 of each back bottom plate stud 161 may be tightened to bear against a back face of the back plate 151.

Once each of the back bottom plate 160 and the front bottom plate 130 are in position on the underside of the railing 110, the back plate 151 may be slid relative to the top plate 115 to move each stud extension 155 from its respective first position 143 of the first slot 141 to the second position 144 of the first slot 141. Sliding the back plate 151 relative to the top plate 115 to move each stud extension 155 from its respective first position 143 of the first slot 141 to the second position 144 of the first slot 141 pulls the back plate 151 and the front plate 120 towards each other, thereby squeezing the railing 100 between the back plate 151 and the front plate 120. The modular apparatus 100 is thereby clamped around the railing 100.

Tightening the back plate tightening head 157 of the stud extension 155 against a top surface of the top plate 115, with the stud extension 155 at the second position 144 of the first slot 141, may further pull the back-bottom plate 160 towards the top plate 115, squeezing the railing 110 between the back-bottom plate 160 and the top plate 115 and locking the apparatus in position around the railing 100.

Removing the modular apparatus 100 from the railing 110 may be accomplished by loosening the back plate tightening head 157 until the back plate 151 may be pulled apart from the top plate 115. The back piece 150 and the front piece may be pulled apart from the railing 100. The back plate 151 and the back-bottom plate 160 may remain assembled together as the back piece 150 and the top plate 115, the front plate 120 and the front bottom plate 130 may remain assembled as the front piece. For future use with the same railing 110, the assembly around the railing 110 of the modular apparatus 100 may be simpler than the initial assembly as subsequent assembly be completed by attaching the back plate 151 to the top plate 115, sliding the back plate 151 relative to the top plate 155 into the final locked position and tightening the back plate tightening head 157.

There are several advantages of the modular apparatus 100 over other systems and apparatus for attaching poles to railings. Once the initial assembly has been completing for a railing, subsequent assembly for the railing may be even simpler, requiring only screwing in the stud extensions 155 and sliding the back plate 151 relative to the top plate 115. Additionally, having an apparatus with plates that may be adjusted relative to adjacent plates may make the system usable with various configurations of railings. The modular nature of the apparatus is a further advantage, as discussed earlier. Damaged or worn plates may be replaced without replacing the entire apparatus. Additionally, specific plates may be switched for different versions of those plates to make the apparatus compatible in a great number of applications. For example, and without limitation, in some embodiments, the top plate 115 may be switched for a larger plate, increasing the compatibility of the modular apparatus 100 with, for example, bleachers that have a larger top surface than regular railings. In some embodiments, the front plate 120 may be replaced with a plate having a different sized holder 105 for holding larger or smaller poles. Holders for different shaped poles may also be substituted in.

Sliding the back plate 151 and the top plate 115 relative to each other to slide the stud extension 155 through the tapered L-slot 140 to the second position 144 of the first leg 142 of the tapered L-slot 140 is advantageous over bolting or clamping mechanisms, including spring loaded clamping methods. The sliding incorporates a simple mechanical process that does not require hinges, springs or additional bolts, thereby providing simpler and more cost-effective manufacturing. The process may also be simpler to use for a consumer. The simple mechanism may also make for greater durability of the modular apparatus 100. Due to the increase in clamping force coming from the sliding action moving the back plate 151 towards the front plate 120 a set amount, the increase in clamping force from the sliding action may be within a set range, making the clamping force predictable and repeatable. This may reduce the risks from overtightening or under tightening the modular apparatus 100 around the railing 110. Additionally, for a user, simply sliding the back plate 151 relative to the top plate 115 may provide both visual and tactile confirmation of that the modular apparatus 100 is correctly locked into position, thereby reducing the possibility of guesswork.

The terminology used herein is for the purpose of describing particular embodiments only and is not intended to be limiting. Accordingly, as used herein, the singular forms “a”, “an” and “the” are intended to include the plural forms as well, unless the context clearly indicates otherwise. It will be further understood that the terms “comprises” and “comprising,” when used in this specification, specify the presence of one or more stated features, integers, steps, operations, elements, and components, but do not preclude the presence or addition of one or more other features, integers, steps, operations, elements, components, and groups.

It is contemplated that any part of any aspect or embodiment discussed in this specification can be implemented or combined with any part of any other aspect or embodiment discussed in this specification.

While particular embodiments have been described in the foregoing, it is to be understood that other embodiments are possible and are intended to be included herein. It will be clear to any person skilled in the art that modifications of and adjustments to the foregoing embodiments, not shown, are possible.

The invention claimed is:

1. A modular apparatus for coupling a pole to a railing, the apparatus comprising:

(a) a holder for holding a pole;

(b) a J shaped bracket piece for attaching onto a first side of a top rail of the railing, the J shaped bracket piece coupled to the holder for holding the holder over a side of the railing, wherein the J shaped bracket piece comprises a top plate for bearing against a top side of the top rail, the top plate comprising at least one tapered L-slot having a first leg running adjacent to a back edge of the top plate, the at least one tapered L-slot having a second leg opening out at the back edge of the top plate, the first leg being less than one third of a total length of the back edge of the top plate and being tapered such that a first end of the first leg is closer to the back edge of the top plate than a second end of the first leg, with the first end of the first leg being adjacent to the second leg of the at least one tapered L-slot;

(c) a back piece comprising a back plate for bearing against a back side of the railing and a back-bottom plate for bearing against a back bottom of the railing, the back-bottom plate being adjustably coupled to the back plate, the back plate having at least one stud extension extending from a top edge for engagement with the at least one tapered L-slot; and (d) a back plate tightening head coupleable with the at least one stud extension for tightening to bear against the top plate to hold the back piece in a first position, the first position being a position where the stud extension is positioned at the first end of the first leg, and for further tightening to bear against the top plate at a locked final position after the back piece is slid relative to the top plate for moving the stud extension into the locked final position, the locked final position being where the stud extension is positioned at the second end of the first leg;

wherein sliding the back piece relative to the front piece such that the stud extension is moved from the first position to the locked final position locks the apparatus onto the railing.

2. The apparatus of claim 1 wherein the J shaped bracket piece further comprises:

(a) a front plate for bearing against a front side of the railing, the front plate being adjustably coupled to the top plate for positioning the front plate relative to the top plate, the front plate being located distal to the back edge of the top plate;

(b) a front-bottom plate for bearing against a front bottom side of the railing, the front-bottom plate being adjustably coupled to the front plate for positioning the front-bottom plate relative to the front plate, wherein the J shaped bracket piece is attachable to the first side of the railing by placing the top plate onto the top of the railing and adjusting the front plate to bear against the front side of the railing and the front-bottom plate to bear against the front bottom side of the railing.

3. The apparatus of claim 2 wherein:

(a) the top plate comprises at least one top plate slot extending laterally from a central portion of the top plate towards a front edge of the top plate;

(b) the front plate comprises at least one front plate stud for extending from a top edge of the front plate for engagement with the at least one top plate slot such that the front plate is slidably engaged with the top plate as well as at least one front-plate tightening head that corresponds with the at least one front plate stud for tightening against the top plate for locking the front plate into position relative to the top plate;

(c) the front plate comprises at least one front plate slot extending along a second length of the front plate and oriented in a vertical direction, the vertical direction being along a line extending from the top plate towards the front-bottom plate;

(d) the front-bottom plate comprises at least one front-bottom plate stud and tightening head combination for engagement with the at least one front plate slot for sliding engagement of the front-bottom plate with the front plate and locking the front-bottom plate into position relative to the front plate;

(e) the back plate comprises at least one back plate slot extending along a fourth length of the back plate and oriented in a second vertical direction, the second vertical direction being along a line extending from the top plate to the back-bottom plate; and (f) the back-bottom plate comprises at least one back-bottom plate stud and tightening head combination for engagement with the at least one back plate slot for sliding engagement of the back-bottom plate with the back plate and locking the back-bottom plate into position relative to the back plate.

4. The apparatus of claim 1 wherein the back plate tightening head forms the head of the stud extension.

5. The apparatus of claim 1 wherein the holder is sized and shaped to hold a pole, wherein the pole is passed through a hole in the holder and held in place by a set screw that screws through a wall of the holder and against the pole.

6. The apparatus of claim 1 wherein the holder is front loading.

7. The apparatus of claim 5 wherein the holder comprises:

(a) a back holder piece coupled to the J shaped bracket piece;

(b) a front holder piece coupled to the back holder piece with a hinged coupling for opening and closing the holder;

(c) a catch for securing the front holder piece to the back holder piece when the holder is in a closed position, with the catch positioned across the holder from the hinged coupling;

(d) a set screw for screwing through a threaded hole in a wall of the front holder piece for tightening against a pole when the holder is in the closed position.

8. The apparatus of claim 6 wherein the catch comprises a lip in the back holder piece and a corresponding hook in the front holder piece for engagement with the lip when the holder is in a closed position.

9. The apparatus of claim 7 wherein the front holder piece further comprises a transverse slot at the hinged coupling for sliding the front holder piece transversely relative to the back holder piece for sliding the hook of the front holder piece over the lip of the back holder piece and closing the holder.

10. The apparatus of claim 2 wherein each of the top plate, the back plate, the front plate, the back-bottom plate and the front-bottom plate comprise at least one replaceable pad attached to a bearing surface of each of the top plate, the back plate, the front plate, the back-bottom plate and the front-bottom plate for engagement with the railing, wherein the at least one replaceable pad is comprised of a material that is softer than the material of its corresponding top plate, back plate, front plate, back-bottom plate or front-bottom plate for gripping the railing.

11. The apparatus of claim 5 wherein the at least one replaceable pad attached to the bearing surface of the back plate and the back-bottom plate has a lower friction coefficient than the back plate or the back-bottom plate for increasing the slidability of the back plate and back-front plate against the railing relative to the slidability of the back plate and back-front plate without the at least one replaceable pad.

12. The apparatus of claim 2 wherein the back-bottom and back-front plates are spaced apart when the apparatus is attached to the railing.

13. The apparatus of claim 1 further comprising a bottom bracket for coupling to the railing from a position underneath the railing, the bottom bracket comprising:

(a) a rod for passing underneath the railing in a direction perpendicular to a first direction, the first direction being a direction oriented along a length of the railing;

(b) a front wall piece coupled to the rod for bearing against a front side of a bottom portion of the railing;

(c) a back wall piece for sliding onto and along the rod relative to the front wall piece for bearing against a back side of the bottom portion of the railing, the back wall piece being reversibly lockable against the back side of the bottom portion of the railing; and (d) a bottom collar for holding a bottom portion of the pole, the bottom collar coupled to the rod at a first rod end of the rod, the first rod end being distal to the back wall piece and proximal to the front wall piece;

wherein locking the back wall piece against the back side of the bottom portion of the railing and holding a bottom portion of the pole in the bottom collar is for reducing torque from the apparatus on the railing.

* * * * *